(12) United States Patent
Sato et al.

(10) Patent No.: US 6,512,758 B1
(45) Date of Patent: Jan. 28, 2003

(54) RETRANSMISSION CONTROL METHOD AND APPARATUS FOR USE IN OFDM RADIO COMMUNICATION SYSTEM

(75) Inventors: Kazumi Sato, Kanagawa-ken (JP); Minoru Namekata, Kanagawa-ken (JP); Mutsumi Serizawa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/226,598

(22) Filed: Jan. 7, 1999

(30) Foreign Application Priority Data

Jan. 8, 1998 (JP) ............................. 10-002658

(51) Int. Cl.[7] ................................. H04J 11/00

(52) U.S. Cl. ..................... 370/344; 370/203; 370/319; 714/52

(58) Field of Search ................... 370/344, 319, 370/235, 230, 203; 714/48, 51, 52, 798

(56) References Cited

U.S. PATENT DOCUMENTS 5,946,320 A * 8/1999 Decker ...................... 370/428
6,175,551 B1 * 1/2002 Awater et al. ............. 370/210
6,181,704 B1 * 1/2002 Drottart et al. ............ 370/410

OTHER PUBLICATIONS

Samir Kallel, Jun. 1995, IEEE, vol. 43, No. 6, Complementary Punctured Convolution (CPC) Codes and Their Applications.*

* cited by examiner

Primary Examiner—Lee Nguyen
(74) Attorney, Agent, or Firm—Oblon, Spivak, McClelland, Maier & Neustadt, P.C.

(57) ABSTRACT

A retransmission control apparatus for use in a radio communication system that uses an orthogonal frequency division multiplexing technique, the apparatus comprising a transmitter which transmits to a radio station a data sequence, which serves as communication data that has been transformed into a time waveform of an orthogonal frequency division multiplexing symbol; a receiver which receives from the radio station a retransmission request for retransmitting the communication data; a transformation mechanism configured to transform, in response to the retransmission request, the data sequence of the communication data to be retransmitted into an orthogonal frequency division multiplexing symbol having a time waveform different from the time waveform of the orthogonal division multiplexing symbol which had been sent before the retransmission request; and a retransmitting mechanism configured to retransmit the communication data transformed by the transformation mechanism to the radio station. Since the time waveform of the resulting OFDM data symbol after the retransmitting operation is changed from that before the retransmitting operation, it is highly likely that the average power of the transmitting signal is increased. As a result, the occurrence of errors when the data sequence is retransmitted is reduced, thereby improving the throughput.

4 Claims, 13 Drawing Sheets

RETRANSMISSION CONTROL METHOD AND APPARATUS FOR USE IN OFDM RADIO COMMUNICATION SYSTEM

BACKGROUND OF THE INVENTION

1. Field of the Invention

The present invention relates to a retransmission control method and a retransmission control apparatus used in transmitting digital data sequences by radio by using orthogonal frequency division multiplexing (OFDM) signals.

2. Discussion of the Background

There is an increasing demand for indoor or outdoor radio data communication systems achieving high-speed data communications. In high-speed radio communication systems, radio signals disadvantageously travel to a receiver by more than one route because they are reflected by obstacles, such as buildings. This is referred to as "multipath interference", resulting in significant degradation of receiving performance. It is therefore very important to decrease the multipath interference in the above type of system. A typical countermeasure being taken against this multipath interference is the use of an equalizer. However, this is not practical because the equalizer is too large for a high-speed radio communication system and seriously hampers the achievement of miniaturized and low-powered high-speed radio communication systems.

Thus, radio communication systems using the OFDM technique, which is robust to multipath interference, are being considered. In the OFDM technique, a multi-carrier transmission system is employed in which signals are transmitted while being superimposed on multiple carriers positioned at minimal orthogonal intervals. In this technique, influence from intersymbol interference caused by multipath distortion can be significantly suppressed, and thus, the quality of the receiving performance can be maintained. The use of the OFDM technique also significantly lowers the transmitting rate of each subcarrier and therefore makes it possible to modulate and demodulate multi-carrier signals by digital-signal batch processing (Fast Fourier Transformation (FFT) and Inverse Fast Fourier Transformation (IFFT)).

However, an OFDM signal waveform per unit time (OFDM symbol), which is also referred to as a time waveform, is like a noise. Thus, the amplitude fluctuation of a time waveform is greater in the multi-carrier transmitting method than in the single-carrier transmitting method. Accordingly, if the back-off amount of a transmission power amplifier is set to be small, nonlinear distortion by the power amplifier occurs, thus lowering the transmission quality, i.e., causing transmission errors.

On the other hand, if, considering a great level of amplitude fluctuation, the back-off amount of the transmission power amplifier is set to be large, transmission power cannot be amplified with high efficiency. A linearizer, which varies the back-off amount, may be used for making the power amplifier operable even with a small back-off amount. However, the use of a linearizer is not suitable because a linearizer is too large for a radio communication system, which hampers the achievement of a miniaturized, low-powered, and inexpensive radio communication system.

One of the solutions to the above problems may be to detect the peak power of each OFDM symbol so as to control the average power of OFDM symbols in accordance with the detected peak power. In this method, the time waveform of each OFDM symbol is normalized by the peak power so as to make the peak power of all the symbols uniform. This makes it possible to reduce the back-off amount of the transmission power amplifier.

According to this method, on the one hand, the transmission power amplifier can be operated with high efficiency, but on the other hand, the transmission quality varies according to the OFDM symbols. Therefore, the average power of OFDM symbols having a large amplitude fluctuation and a high level of amplitude is highly suppressed, thus degrading the transmission quality, i.e., encouraging transmission errors.

Therefore, in performing data communications between a radio base station and a radio terminal station, if transmission errors are detected, a request is made to retransmit the same data. However, since such transmission errors are caused by the time waveform of an OFDM symbol, errors may occur again to the retransmitted data, thereby causing a decrease in the throughput.

As discussed above, in the conventional OFDM transmitting method the transmission power amplifier can be operated with high efficiency without requiring a large-scale apparatus. In this method, however, the average power of OFDM symbols having a large amplitude fluctuation and a high level of amplitude is suppressed. As a consequence, the transmission quality is lowered, i.e., the transmission errors are encouraged. There is also a high possibility of causing errors in the data retransmitted in response to a retransmission request. This entails repeated transmission, thereby lowering the throughput.

SUMMARY OF THE INVENTION

Accordingly, in order to solve the above problems, it is an object of the present invention to provide a retransmission control method and a retransmission control apparatus in which the throughput is improved due to reduced retransmission errors by suppressing amplitude fluctuation of an OFDM time waveform and by improving the average transmission power when data is retransmitted.

In order to achieve the above object, according to one aspect of the present invention, there is provided a retransmission control apparatus for use in a radio communication system that uses an orthogonal frequency division multiplexing technique. The retransmission control apparatus includes transmitting means for transmitting to a radio station a data sequence, which serves as communication data that has been transformed into a time waveform of an orthogonal frequency division multiplexing symbol. Receiving means receives from the radio station a retransmission request for retransmitting the communication data. Transformation means transforms, in response to the retransmission request, the data sequence of the communication data to be retransmitted into an orthogonal frequency division multiplexing symbol having a time waveform different from the time waveform of the orthogonal division multiplexing symbol which had been sent before the retransmission request. Retransmitting means retransmits the communication data transformed by the transformation means to the radio station.

According to another aspect of the present invention, there is provided a retransmission control apparatus for use in a radio communication system that uses an orthogonal frequency division multiplexing technique. The retransmission control apparatus includes transmitting means for transmitting to a radio station a data sequence, which serves as communication data that has been transformed into a time waveform of an orthogonal frequency division multiplexing symbol. Receiving means receives from the radio station a retransmission request for retransmitting the communication data. Scramble means scrambles, in response to the retransmission request, the data sequence of the communication data to be retransmitted at least for the same communication data in accordance with a scramble sequence that varies every time the data sequence is retransmitted, and transforms the scrambled data sequence into an orthogonal frequency division multiplexing symbol having a time waveform different from the time waveform of the orthogonal division multiplexing symbol which had been sent before the retransmission request. Retransmitting means retransmits the communication data transformed by the scramble means to the radio station.

According to still another aspect of the present invention, there is provided a retransmission control apparatus for use in a radio communication system that uses an orthogonal frequency division multiplexing technique. The retransmission control apparatus includes transmitting means for transmitting to a radio station a data sequence, which serves as communication data that has been transformed into a time waveform of an orthogonal frequency division multiplexing symbol. Receiving means receives from the radio station a retransmission request for retransmitting the communication data. Reordering means reorders, in response to the retransmission request, the data sequence of the communication data to be retransmitted at least for the same communication data in accordance with a reordering method that varies every time the data sequence is retransmitted, and transforms the reordered data sequence into an orthogonal frequency division multiplexing symbol having a time waveform different from the time waveform of the orthogonal division multiplexing symbol which had been sent before the retransmission request. Retransmitting means retransmits the communication data transformed by the reordering means to the radio station.

According to a further aspect of the present invention, there is provided a retransmission control apparatus for use in a radio communication system that uses an orthogonal frequency division multiplexing technique. The retransmission control apparatus includes transmitting means for transmitting to a radio station a data sequence, which serves as communication data that has been transformed into a time waveform of an orthogonal frequency division multiplexing symbol. Receiving means receives from the radio station a retransmission request for retransmitting the communication data. Reordering means reorders, in response to the retransmission request, a spectrum signal obtained by modulating the data sequence of the communication data to be retransmitted at least for the same communication data, in accordance with a reordering method that varies every time the data sequence is retransmitted, and transforms the reordered spectrum signal into an orthogonal frequency division multiplexing symbol having a time waveform different from the time waveform of the orthogonal division multiplexing symbol which had been sent before the retransmission request. Retransmitting means retransmits the communication data transformed by the reordering means to the radio station.

According to a yet further aspect of the present invention, there is provided a retransmission control method for use in a communication system which is formed of a plurality of radio stations for transmitting and receiving communication data by using an orthogonal frequency division multiplexing technique. The retransmission control method which is employed by a transmitting radio station includes the steps of: receiving a retransmission request for retransmitting the communication data from a receiving radio station; and transforming, in response to the retransmission request, a data sequence to be retransmitted into an orthogonal frequency division multiplexing symbol having a time waveform different from the time waveform of the orthogonal frequency division multiplexing symbol which had been sent before the retransmission request, and transmitting the orthogonal frequency division multiplexing symbol as a retransmission signal in correspondence with the retransmission request.

According to a further aspect of the present invention, there is provided a retransmission control method for use in a communication system which is formed of a plurality of radio stations for transmitting and receiving communication data by using an orthogonal frequency division multiplexing technique. The retransmission control method which is employed by a transmitting radio station includes the steps of: receiving a retransmission request for retransmitting the communication data from a receiving radio station; and scrambling, in response to the retransmission request, a data sequence to be retransmitted for the same transmitting data in accordance with a scramble sequence that varies every time the data sequence is retransmitted, so as to obtain an orthogonal frequency division multiplexing symbol having a time waveform different from the time waveform of the orthogonal frequency division multiplexing symbol which had been sent before the retransmission request, and transmitting the orthogonal frequency division multiplexing symbol as a retransmission signal in correspondence with the retransmission request.

According to a further aspect of the present invention, there is provided a retransmission control method for use in a communication system which is formed of a plurality of radio stations for transmitting and receiving communication data by using an orthogonal frequency division multiplexing technique. The retransmission control method which is employed by a transmitting radio station includes the steps of: receiving a retransmission request for retransmitting the communication data from a receiving radio station; and reordering, in response to the retransmission request, a data sequence to be retransmitted at least for the same transmitting data in accordance with a reordering method that varies every time the data sequence is retransmitted, so as to obtain an orthogonal frequency division multiplexing symbol having a time waveform different from the time waveform of the orthogonal frequency division multiplexing symbol which had been sent before the retransmission request, and transmitting the orthogonal frequency division multiplexing symbol as a retransmission signal in correspondence with the transmission request.

According to a further aspect of the present invention, there is provided a retransmission control method for use in a communication system which is formed of a plurality of radio stations for transmitting and receiving communication data by using an orthogonal frequency division multiplexing technique. The retransmission control method which is employed by a transmitting radio station includes the steps of: receiving a retransmission request for retransmitting the communication data from a receiving radio station; and reordering, in response to the retransmission request, a spectrum signal obtained by modulating a data sequence to be retransmitted at least for the same transmitting data, in accordance with a reordering method that varies every time the data sequence is retransmitted, so as to obtain an orthogonal frequency division multiplexing symbol having a time waveform different from the time waveform of the orthogonal frequency division multiplexing symbol which had been sent before the retransmission request, and transmitting the orthogonal frequency division multiplexing symbol as a retransmission signal in correspondence with the retransmission request.

DESCRIPTION OF THE PREFERRED EMBODIMENTS

Figure 1:
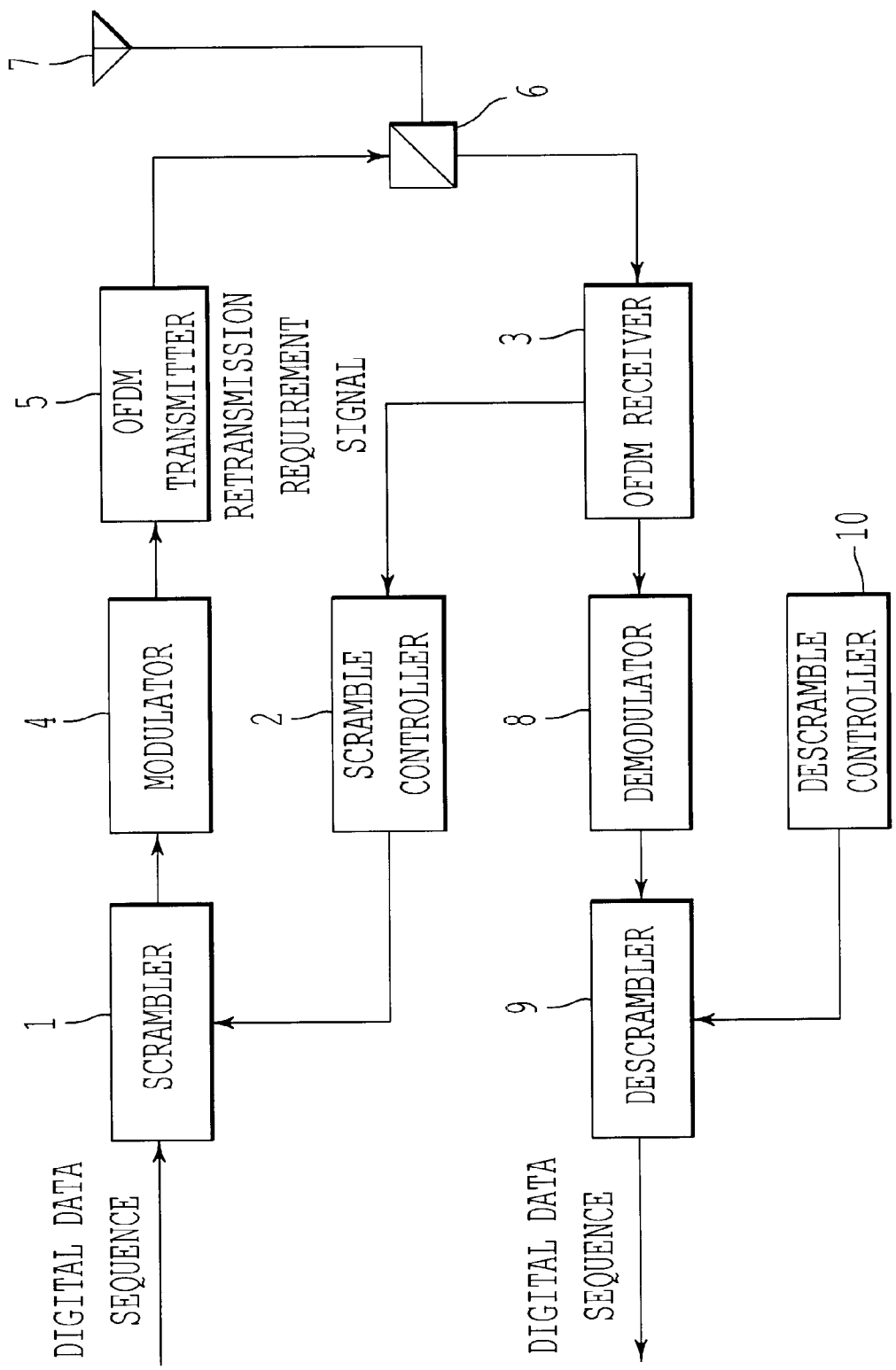
FIG. 1 is a block diagram of a retransmission control apparatus according to an embodiment of the present invention.

Preferred embodiments of the present invention are described in detail with reference to the drawings. FIG. 1 illustrates a base station and a radio terminal for use in a radio communication system incorporating a retransmission control apparatus according to an embodiment of the present invention. In this embodiment, upon receiving a retransmission requirement signal, the base station or the radio terminal scrambles a digital data sequence to be retransmitted.

Referring to the block diagram of FIG. 1, a transmitting system is formed of a scrambler 1, a scramble controller 2, a modulator 4, an OFDM transmitter 5, a signal branching filter 6, and an antenna 7. A receiving system is formed of the antenna 7, the signal branching filter 6, an OFDM receiver 3, a demodulator 8, a descrambler 9, and a descramble controller 10.

A digital data sequence is first input into the scrambler 1. The scrambler 1 then scrambles the digital data sequence according to a predetermined scrambling technique and outputs it to the modulator 4. In this embodiment, a scramble sequence of the scrambler 1 is controlled by the scramble controller 2. A digital data sequence to be input into the scrambler 1 may be convolutionally coded, reed-Solomon (RS) coded, and interleaved digital data.

Upon receiving a retransmission requirement signal from the OFDM receiver 3, which is described in detail later, the scramble controller 2 sets a scramble sequence different from the scramble sequence set prior to the retransmission operation. It is essential only that the scramble controller 2 differentiates scramble sequences before and after retransmission. Alternatively, the scramble controller 2 may control the scrambler 1 to scramble a digital data sequence to be retransmitted in response to a retransmission requirement signal and to not scramble the other digital data sequences.

The modulator 4 performs a predetermined modulation on the input digital data sequence and outputs it to the OFDM transmitter 5. The OFDM transmitter 5 creates an OFDM symbol by performing signal processing, such as transforming the digital data into a time signal by executing IFFT, digital-to-analog (D/A) conversion, and guard time insertion for absorbing delayed wave components caused by multipath. The OFDM transmitter 5 then creates a transmitting signal by performing frequency conversion on the OFDM symbol and outputs it to the signal branching filter 6.

The signal branching filter 6 sends the transmitting signal via the antenna 7 and receives a receiving signal from the antenna 7 and supplies it to the OFDM receiver 3. The transmitting signal transmitted from the antenna 7 is received by an external apparatus (not shown). The external apparatus transmits a retransmission request if the transmitting signal contains transmission errors.

In the receiving system, the receiving signal received via the antenna 7 is supplied to the OFDM receiver 3 via the signal branching filter 6. The OFDM receiver 3 retrieves the OFDM symbol by conducting frequency conversion on the transmitting signal. The OFDM receiver 3 also retrieves the original data sequence by executing FFT and outputs 4 to the demodulator 8. In this embodiment, if the receiving signal represents a retransmission request indicating the occurrence of transmission errors sent from an external apparatus, the OFDM receiver 3 generates a retransmission requirement signal and supplies it to the scramble controller 2.

The demodulator 8 demodulates the input data sequence to reproduce the original digital data sequence and outputs it to the descrambler 9. The descrambler 9 descrambles the input digital data sequence under the control of the descramble controller 10 in correspondence with the scramble sequence set in the transmitting system so as to reproduce the original digital data sequence. If the digital data sequence is not scrambled in the transmitting system, the descramble controller 10 controls the descrambler 9 to directly output the input data without descrambling it.

The retransmission request may be detected by another element other than the OFDM receiver 3. In other words, the retransmission request may be detected, for example, after the data has been transformed into the receiving digital data sequence.

Figure 2:
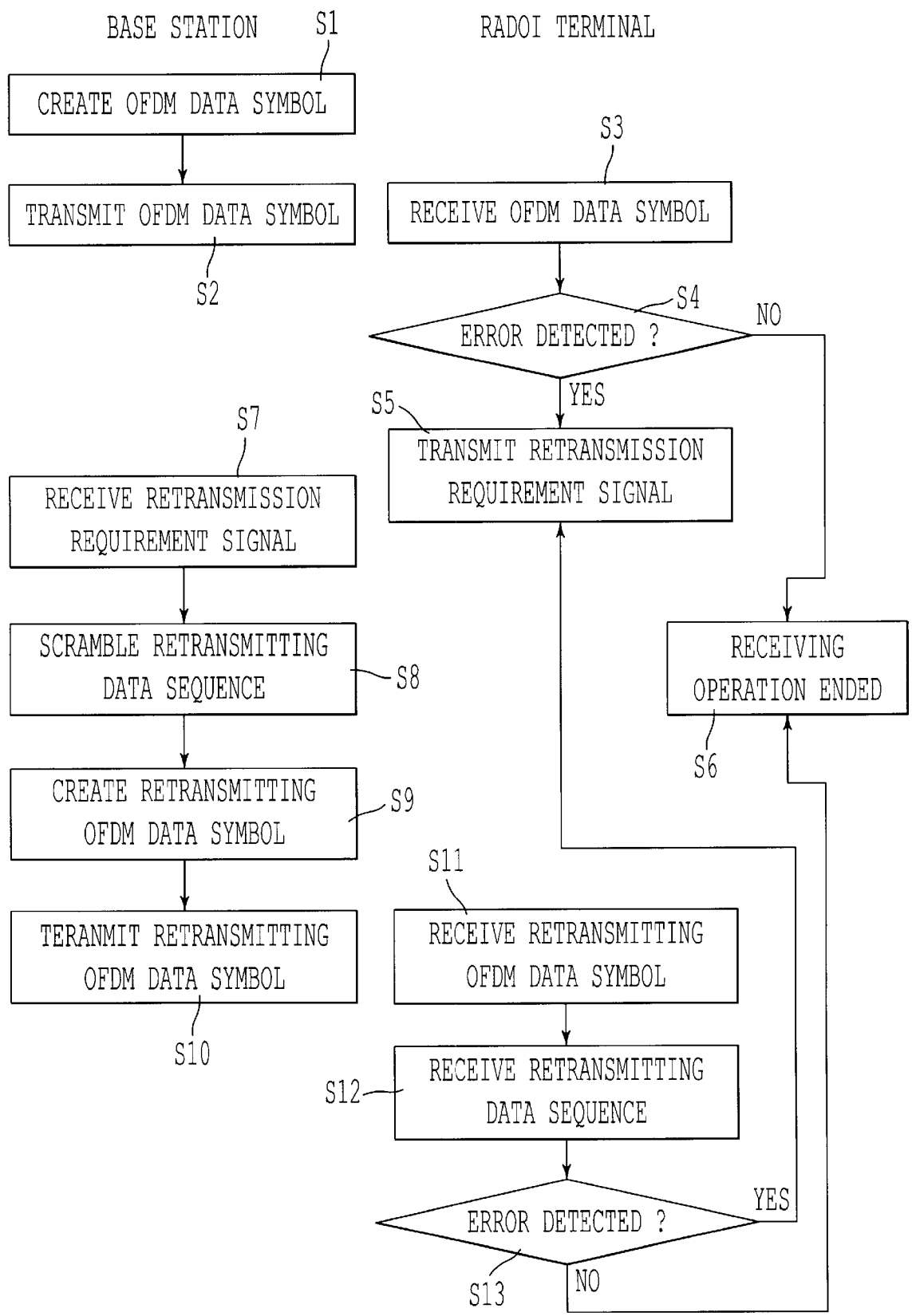
FIG. 2 is a flow chart illustrating a retransmission control method according to an embodiment of the present invention.

The operation of the retransmission control apparatus constructed as described above is discussed hereinafter with reference to the flow chart of FIG. 2. FIG. 2 illustrates a process flow performed by the base station and the radio terminal. The left side of the flow chart represents the process by the base station, while the right side of the flow chart indicates the process by the radio terminal. In this embodiment, an OFDM data symbol is transmitted from the base station and received by the radio terminal.

In step S1 of FIG. 2, an OFDM data symbol is created in the base station. More specifically, a digital data sequence to be transmitted is input into the scrambler 1 and scrambled according to a predetermined scramble sequence. The digital data sequence may not necessarily be scrambled in the scrambler 1. The digital data sequence output from the scrambler 1 is modulated by the modulator 4 and is supplied to the OFDM transmitter 5. The OFDM transmitter 5 creates an OFDM symbol by performing signal processing, such as transforming the digital data into a time signal by executing IFFT, D/A conversion, and guard time insertion for absorbing delayed wave components caused by multipath. The OFDM transmitter 5 then creates a transmitting signal by performing frequency conversion on the OFDM symbol. In step S2, the transmitting signal is transmitted to the radio terminal from the signal branching filter 6 via the antenna 7.

In step S3, the radio terminal receives the OFDM data symbol. It is assumed that the OFDM symbol received by the antenna 7 is an OFDM data symbol (which is other than an Ack or Nack signal). The OFDM receiver 3 performs processing, such as frequency conversion, guard time removal, A/D conversion, and transformation into a spectrum signal by executing FFT, on the OFDM symbol received via the signal branching filter 6. The spectrum signal is then supplied to the demodulator 8.

The demodulator 8 transforms the spectrum signal into a receiving digital data sequence and outputs it to the descrambler 9. Since the receiving digital data sequence has been scrambled by the scramble signal under the control of the scramble controller 2, it is descrambled by a descramble signal in the descrambler 9, thereby reproducing the original digital data sequence.

In step S4, the radio terminal performs error detection on the OFDM data symbol. If any error is detected in step S4, the radio terminal transmits a retransmission requirement signal to the base station in step S5. If an error is not detected in step S4, the radio terminal transmits an acknowledgment (Ack) signal to the base station, though it is not essential, and the receiving operation is completed in step S6.

It is now assumed that the radio terminal detects a transmission error. In this case, a retransmission requirement signal is sent from the radio terminal in step S5 and is received by the antenna 7 of the base station in step S7.

The base station may detect that the receiving digital data sequence indicates a retransmission request when the OFDM receiver 3 receives the OFDM data symbol or after the demodulator 8 transforms the spectrum signal into the digital data sequence.

Upon detecting a retransmission request, the OFDM receiver 3 outputs a retransmission requirement signal to the scramble controller 2. Then, a retransmitting digital data sequence is input into the scrambler 1 and, in step S8, it is scrambled in accordance with the retransmission requirement signal. In this case, the scramble controller 2 causes the scrambler 1 to scramble the retransmitting digital data sequence by using a scramble sequence different from the scramble sequence used prior to this retransmitting operation. The scramble controller 2 may control, for example, in the following manner. If the digital data sequence is not scrambled when it is transmitted for the first time, it is scrambled with a predetermined scramble sequence when it is retransmitted. An output of the scrambler 1 is again modulated in the modulator 4 and is transformed into an OFDM data symbol in the OFDM transmitter 5 in step S9.

Since the retransmitting digital data sequence is scrambled, the time waveform of the OFDM data symbol reproduced from the same digital data prior to this retransmitting operation is different from that of the OFDM data symbol after this retransmitting operation, thus resulting in a change in the peak power.

The base station transmits the retransmitting OFDM data symbol in step S10, and the radio terminal receives it in step S11. The radio terminal then descrambles the retransmitting digital data sequence by using the descramble signal so as to reproduce the original data sequence in step S12 and performs error detection in step S13.

If any error is detected in step S13, the process returns to step S5 in which the radio terminal again sends a retransmission requirement signal to the base station. If an error is not detected in step S13, the process returns to step S6 in which the radio terminal sends an acknowledgment (Ack) signal to the base station, though it is not essential, and the receiving operation is ended. As discussed in the description of the related art, in the radio communication system which transmits OFDM symbols, a restricted back-off amount of a transmission power amplifier may distort the time waveform of a transmitting OFDM symbol. This originates from a significant increase in the peak power of the OFDM symbol prior to a retransmitting operation. On the other hand, in the base station and the radio terminal shown in FIG. 1 constructed in accordance with the present invention, the peak power of a retransmitting OFDM symbol is different from that of an OFDM symbol prior to the retransmitting operation. This makes it possible to suppress the amplitude fluctuation of the time waveform of the retransmitting OFDM symbol and thus to improve the average transmission power, thereby reducing transmission errors when digital data is retransmitted.

As described above, according to the foregoing embodiment, the scramble sequence used for scrambling the retransmitting digital data sequence is differentiated from that used before the retransmitting operation, which inhibits the amplitude fluctuation of the time waveform of a retransmitting OFDM symbol, thereby enhancing the average transmission power. This further makes it possible to reduce transmission errors in retransmitting the digital data sequence, thereby improving the throughput.

Figure 3:
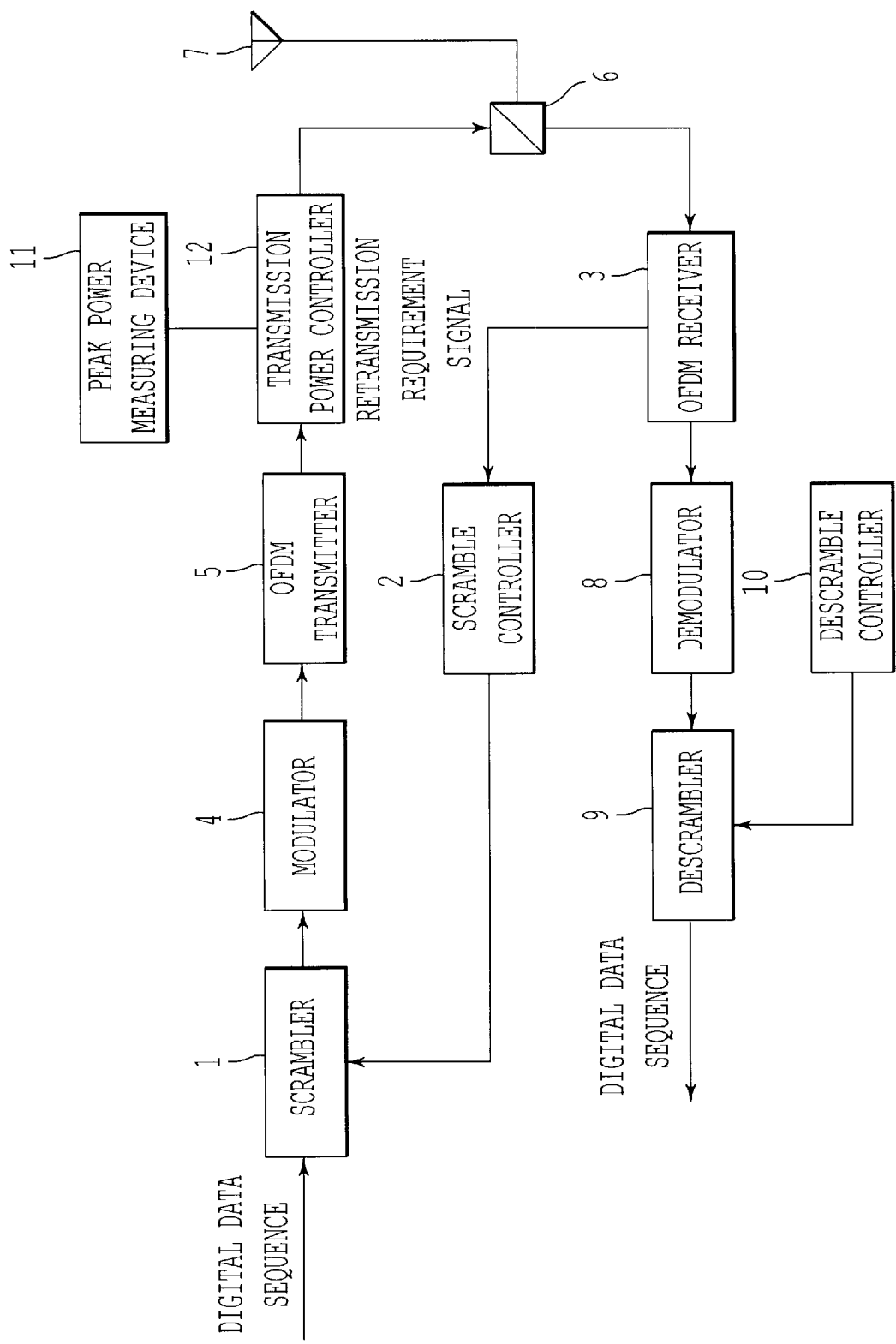
FIG. 3 is a block diagram illustrating a retransmission control apparatus according to another embodiment of the present invention.

FIG. 3 is a block diagram illustrating another embodiment of the present invention. The same elements as those shown in FIG. 1 are designated with like reference numerals, and an explanation thereof is thus omitted. More specifically, FIG. 3 illustrates a base station and a radio terminal for use in a radio communication system that detects the peak power of the time waveform of each OFDM symbol so as to control the average power of the OFDM symbols in accordance with the detected peak power.

The base station and the radio terminal shown in FIG. 3 are constructed in a manner similar to those of the previous embodiment shown in FIG. 1, except that a peak power measuring device 11 and a transmission power controller 12 are included in this embodiment.

Upon receiving from the OFDM transmitter 5 an OFDM data symbol produced from the digital data sequence, the peak power measuring device 11 measures the peak power of the time waveform of the received OFDM data symbol and outputs it to the transmission power controller 12. Meanwhile, the transmission power controller 12 receives the OFDM data symbol from the OFDM transmitter 5 and then changes the transmission power of the OFDM data symbol in accordance with the peak power measured in the peak power measuring device 11. The control operation by the transmission power controller 12 may be as follows. The time waveform of each OFDM data symbol is normalized by the peak power so as to make the peak power of all the symbols uniform.

In this embodiment, as well as in the previous embodiment, if the OFDM receiver 3 transmits a retransmission requirement signal to the scramble controller 2 in response to a retransmission request, the digital data sequence is input into the scrambler 1 again. If the digital data sequence was not scrambled when it was transmitted for the first time, the scramble controller 2 controls the scrambler 1 to scramble the digital data sequence when it is retransmitted. The scrambled digital data sequence is transformed into an OFDM data symbol. Because the retransmitting digital data sequence is scrambled, h is highly expected that the peak power of the retransmitting OFDM data symbol is smaller than that sent for the first time.

As discussed in the description of the related art, the reason for erroneously receiving the OFDM data symbol may be the significantly reduced average power caused by a considerably large peak power. In this case, if the same OFDM data symbol is simply retransmitted in response to a retransmission requirement signal, it is highly likely that transmission errors may occur again. According to the retransmission control method of this embodiment, however, it is highly expected that the average power of a retransmitting OFDM symbol is maintained, thereby reducing the occurrence of transmission errors in the retransmitting OFDM symbol. In this manner, according to this embodiment, advantages similar to those offered by the previous embodiment illustrated in FIG. 1 can be obtained.

Figure 4:
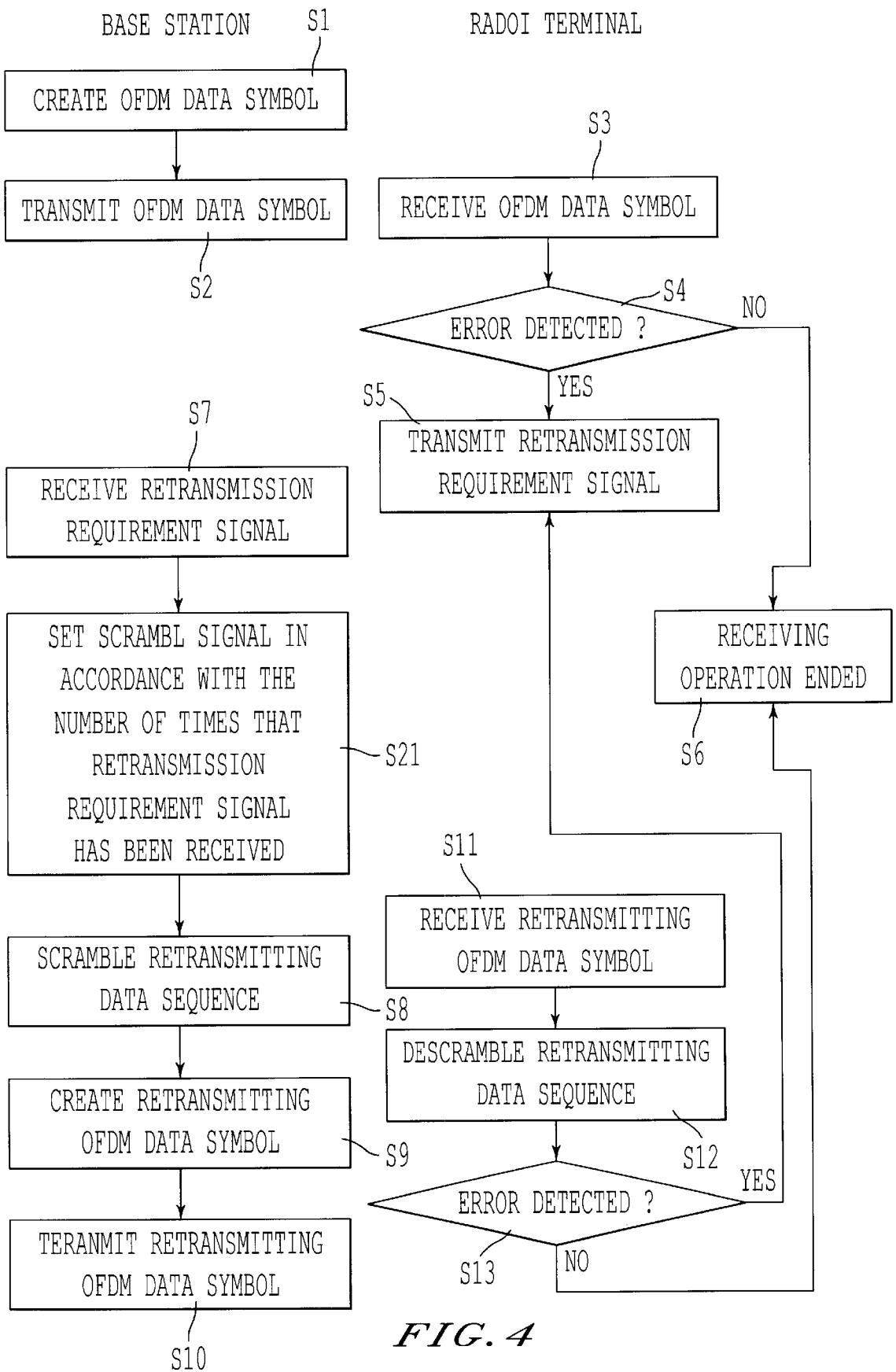
FIG. 4 is a flow chart illustrating a retransmission control method according to still another embodiment of the present invention.

FIG. 4 is a flow chart illustrating the process of the retransmission control method according to another embodiment of the present invention. The same steps as those shown in FIG. 2 are designated with like step numbers, and an explanation thereof is thus omitted. The base station and the radio terminal constructed in accordance with the embodiment illustrated in FIG. 1 may be used for the counterparts for implementing the retransmission control method of this embodiment.

This embodiment differs from the retransmission control method shown in FIG. 2 only in the scramble control operation and the descramble control operation. Namely, in this embodiment, step S21 is added to the process of the control method illustrated in FIG. 2, and only the operations performed by the scramble controller 2 and the descramble controller 10 of this embodiment are different from those of the retransmission control apparatus shown in FIG. 1.

The transmitting operation of an OFDM data symbol performed by the base station or the radio terminal is first explained below. When the OFDM receiver 3 detects a retransmission request after the OFDM data symbol has been transmitted, a retransmitting digital data sequence is input into the scrambler 1. The scramble controller 2 then sets the scramble signal to be used for scrambling the retransmission digital data sequence in accordance with the number of times that the retransmission requirement signal has been received by the transmitting system. The scramble signal may be set, for example, as follows. Every time the scramble controller 2 receives a retransmission requirement signal, it selects one of a plurality of preset scramble sequences in turns, or may utilize them randomly.

A description is now given below of the receiving operation of an OFDM symbol performed by the base station or the radio terminal according to the retransmission control method illustrated in FIG. 4.

It is now assumed that the OFDM symbol received by the antenna 7 is an OFDM data symbol (which is other than an Ack or Nack signal). The receiving OFDM data symbol is transformed into a spectrum signal in the OFDM receiver 3 and is then demodulated in the demodulator 8, thereby retrieving a receiving digital data sequence. The descramble controller 10 sets a descramble signal corresponding to the scramble signal used for scrambling the OFDM data symbol in the transmitting system. The descramble signal is then supplied to the descrambler 9 and is descrambled. As a consequence, the originally ordered digital data sequence that had been before being scrambled is reproduced.

If, on the other hand, the OFDM symbol received by the antenna 7 is a retransmission requirement signal, it is determined, according to the OFDM receiver 3 or the digital data sequence output from the descrambler 9, the number of times that the retransmission requirement signal for the same OFDM signal or the same digital data sequence has thus far been transmitted. Upon receipt of a retransmission requirement signal, the digital data sequence is scrambled in accordance with the number of times that the retransmission requirement signal has been transmitted and is again modulated in the modulator 4. The digital data sequence is further transformed into an OFDM data symbol in the OFDM transmitter 5 and is then transmitted to the receiving system.

The operation of the retransmission control apparatus constructed in accordance with the above embodiment is discussed hereinafter with reference to FIG. 4. In this embodiment, it is now assumed that an OFDM data symbol is transmitted from the base station and received by the radio terminal.

An OFDM data symbol is created in the base station in step S1, and is transmitted to the radio terminal in step S2. Upon receiving the OFDM data symbol in step S3, the radio terminal performs error detection on the OFDM data symbol in step S4.

If any error is detected in the receiving OFDM data symbol in step S4, the radio terminal sends a retransmission requirement signal to the base station in step S5. If an error is not detected in step S4, the radio terminal sends an acknowledgment (Ack) signal to the base station, though it is not essential, and the receiving operation is completed in step S6.

Meanwhile, upon receiving the retransmission requirement signal in step S7, the base station sets a scramble signal to be used for scrambling the retransmitting digital data sequence. In this embodiment, in step S21, the scramble signal is set in accordance with the number of times that the retransmission requirement signal has been received by the transmitting system.

The scramble signal is set, for example, in the scramble controller 2 shown in FIG. 1, in the following manner. Every time the scramble controller 2 receives a retransmission requirement signal, it may select one of a plurality of scramble sequences in turns, or may utilize them randomly.

The base station then scrambles the retransmitting data sequence according to the selected scramble sequence in step S8, and generates a retransmitting OFDM data symbol in step S9. Thereafter, the base station transmits the retransmitting OFDM data symbol in step S10, and the radio terminal receives the retransmitting OFDM data symbol in step S11.

Subsequently, the radio terminal descrambles the retransmitting OFDM data symbol by using a descramble signal in step S12, and then performs error detection on the descrambled OFDM data symbol in step S13. If any error is detected in step S13, the process returns to step S5 in which the radio terminal again sends a retransmission requirement signal to the base station. If an error is not detected in step S13, the process returns to step S6 in which the radio terminal sends an acknowledgment (Ack) signal to the base station, though it is not essential, and the receiving operation is ended in step S6.

As discussed above, in this embodiment, the retransmitting digital data sequence is scrambled in accordance with the number of times that the retransmission requirement signal has been received by the transmitting system. With this arrangement, the amplitude fluctuation of the time wave of the retransmitting OFDM data symbol can be suppressed, and the average transmission power can thus be enhanced, thereby reducing, transmission errors when digital data is retransmitted.

Figure 5:
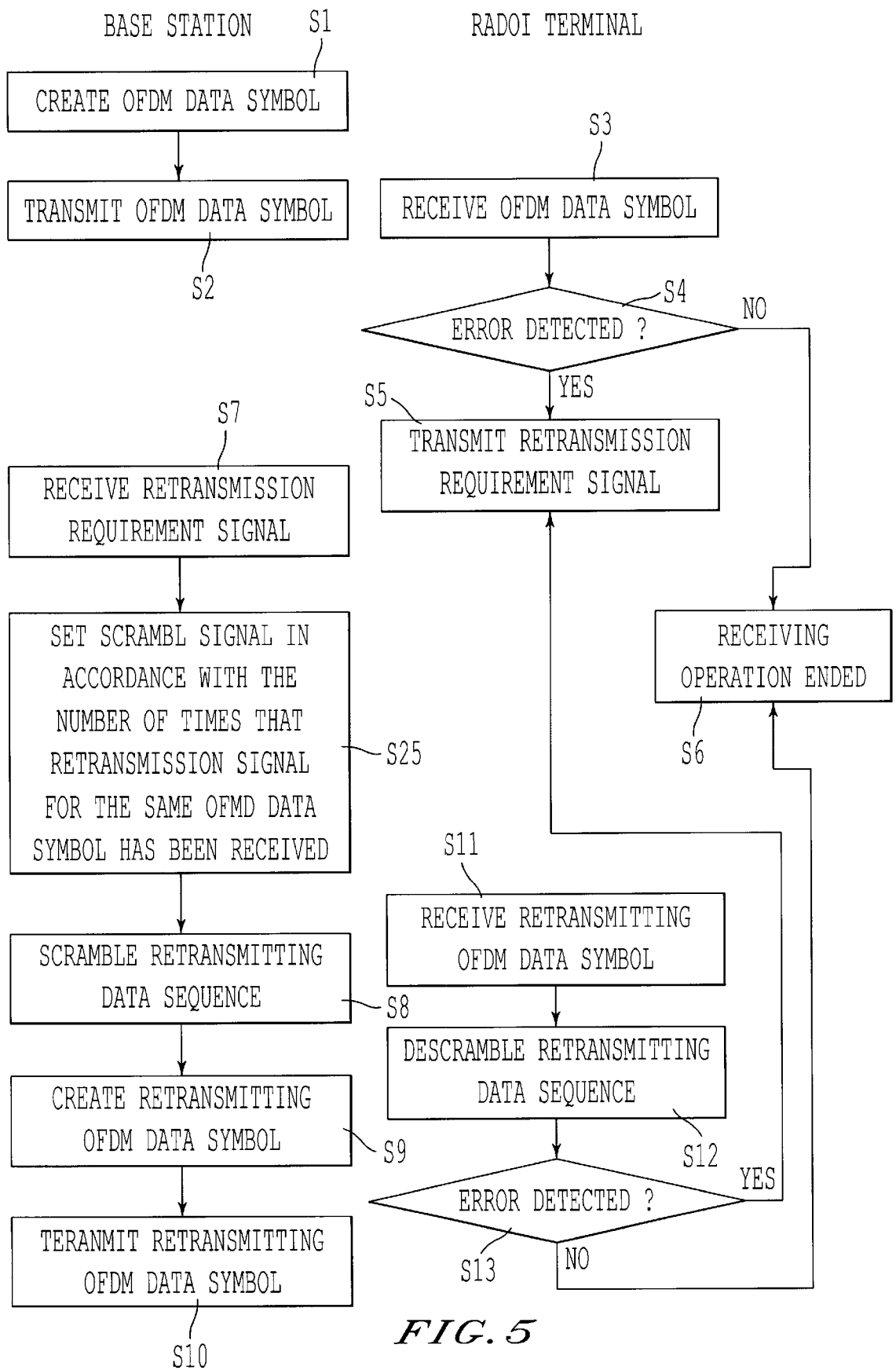
FIG. 5 is a flow chart illustrating a retransmission control method according to a further embodiment of the present invention.

FIG. 5 is a flow chart illustrating still another embodiment of the present invention. The same steps as those shown in FIG. 2 are indicated by like step numbers, and an explanation thereof is thus omitted. The base station and the radio terminal constructed in accordance with the embodiment illustrated in FIG. 1 may be used for the counterparts for implementing the retransmission control method of this embodiment.

This embodiment, as well as the previous embodiment, differs from the retransmission control method illustrated in FIG. 2 merely in the scramble control operation and the descramble control operation. Namely, in this embodiment, step S25 is added to the process of the retransmission control method shown in FIG. 2, and only the operations performed by the scramble controller 2 and the descramble controller 10 are different from those of the retransmission control apparatus shown in FIG. 1.

The transmitting operation of an OFDM data symbol performed by the base station or the radio terminal is first discussed below. When the OFDM receiver 3 illustrated in FIG. 1 detects a retransmission request, a retransmitting digital data sequence is input into the scrambler 1. In this embodiment, the scramble controller 2 can make a determination of whether the OFDM data symbol input into the scrambler 1 is the same as that sent before this retransmitting operation. The scramble controller 2 then sets the scramble signal to be used for scrambling the retransmitting data sequence in accordance with the number of times that the retransmission requirement signal for the same OFDM data symbol has been received by the transmitting system. The scramble signal may be set, for example, as follows. The scramble controller 2 presets a plurality of preset scramble sequences and selects one of them in accordance with the number of times that the retransmission requirement signal for the same OFDM data symbol has been received by the transmitting system.

The receiving operation of an OFDM symbol conducted by the, base station or the radio terminal according to the retransmission control method illustrated in FIG. 5 is now discussed below.

It is now assumed that the OFDM symbol received by the antenna 7 is an OFDM data symbol (which is other than an Ack or Nack signal). The receiving OFDM data symbol is transformed into a spectrum signal in the OFDM receiver 3 and is then demodulated in the demodulator 8, thereby retrieving a receiving digital data sequence. The receiving digital data sequence is descrambled by using a descramble signal under the control of the descramble controller 10 so as to reproduce the originally ordered digital data sequence that had been before being scrambled in the transmitting system. More specifically, the descramble controller 10 sets the descramble signal corresponding to the scramble signal used for scrambling the OFDM data symbol in the transmitting system. The descrambler 9 descrambles the output of the demodulator 8 by using the descrambled signal so as to output the originally ordered digital data sequence.

As noted above, the transmitting system sets the scramble signal to be used for scrambling the retransmitting digital data sequence in accordance with the number of times that the retransmission requirement signal for the same OFDM data symbol has been received by the transmitting system. This enables the receiving system to set the descramble signal based on the number of retransmission requests for the same OFDM data symbol.

When the OFDM symbol received by the antenna 7 is a retransmission requirement signal, it is determined, according to the OFDM receiver 3 or the digital data sequence output from the descrambler 9, the number of times that the retransmission requirement signal for the same digital data sequence has been received. Upon receiving the retransmission requirement signal, the digital data sequence is scrambled in the scrambler 1 in accordance with the number of times that the retransmission requirement signal has been received, and is then modulated in the modulator 4. The digital data sequence is further transformed into an OFDM data symbol in the OFDM transmitter 5 and is then transmitted to the receiving system.

The operation performed by the retransmission control apparatus constructed as described above is described hereinbelow with reference to FIG. 5. In this embodiment, it is now assumed that an OFDM data symbol is transmitted from the base station and received by the radio terminal.

The base station generates an OFDM data symbol in step S1, and then transmits it to the radio terminal in step S2. Upon receiving the OFDM data symbol in stop S3, the radio terminal performs error detection on the OFDM data symbol in step S4.

If any error is detected in step S4, the radio terminal sends a retransmission requirement signal to the base station in step S5. If an error is not detected in step S4, the radio terminal sends an acknowledgment (Ack) signal to the base station, though it is not essential, and the receiving operation is ended in step S6.

Meanwhile, upon receipt of the retransmission requirement signal in step S7, the base station sets the scramble signal to be used for scrambling the retransmitting data sequence. In this embodiment, as discussed above, the base station sets the scramble signal in stop S25 in accordance with the number of times that the retransmission requirement signal for the same OFDM data symbol has been received by the transmitting system.

The scramble signal may be set, for example, in the scramble controller 2 shown in FIG. 1 in the following manner. The scramble controller 2 first presets a plurality of scramble sequences corresponding to the number of times that the retransmission requirement signal for the same OFDM data symbol has been retransmitted and then selects one of the scramble sequences in accordance with the number of times that the retransmission requirement signal has been received.

The base station scrambles the retransmitting data sequence by using the selected scramble sequence in step S8 and creates a retransmitting OFDM data symbol in step S9. The base station then transmits the retransmitting OFDM data symbol to the radio terminal in step S10. Upon receipt of the retransmitting OFDM data symbol in step S11, the radio terminal descrambles the retransmitting digital data sequence by using the descramble signal in step S12, and further performs error detection on the data sequence in step S13.

If an error is detected in step S13, the process returns to step S5 in which the radio terminal again sends a retransmission requirement signal to the base station. If an error is not detected in step S13, the process returns to step S6 in which the radio terminal sends an acknowledgment (Ack) signal to the base station, though ft is not essential, and the receiving operation is completed.

As is seen from the foregoing description, according to this embodiment, the retransmitting digital data sequence is scrambled in accordance with the number of times that the retransmission requirement signal for the same OFDM data symbol has been received by the transmitting system. It is thus possible to inhibit the amplitude fluctuation of the time waveform of the retransmitting OFDM data symbol, thereby improving the average transmission power. As a consequence, the occurrence of transmission errors when digital data sequence is retransmitted can be reduced. Additionally, the average transmission power of the time waveform of the OFDM data symbol is changed every time the retransmission requirement signal for the same OFDM data symbol is sent. Thus, an improvement in the average transmission power can reduce the occurrence of the transmission errors in retransmitting the digital data sequence.

Figure 6:
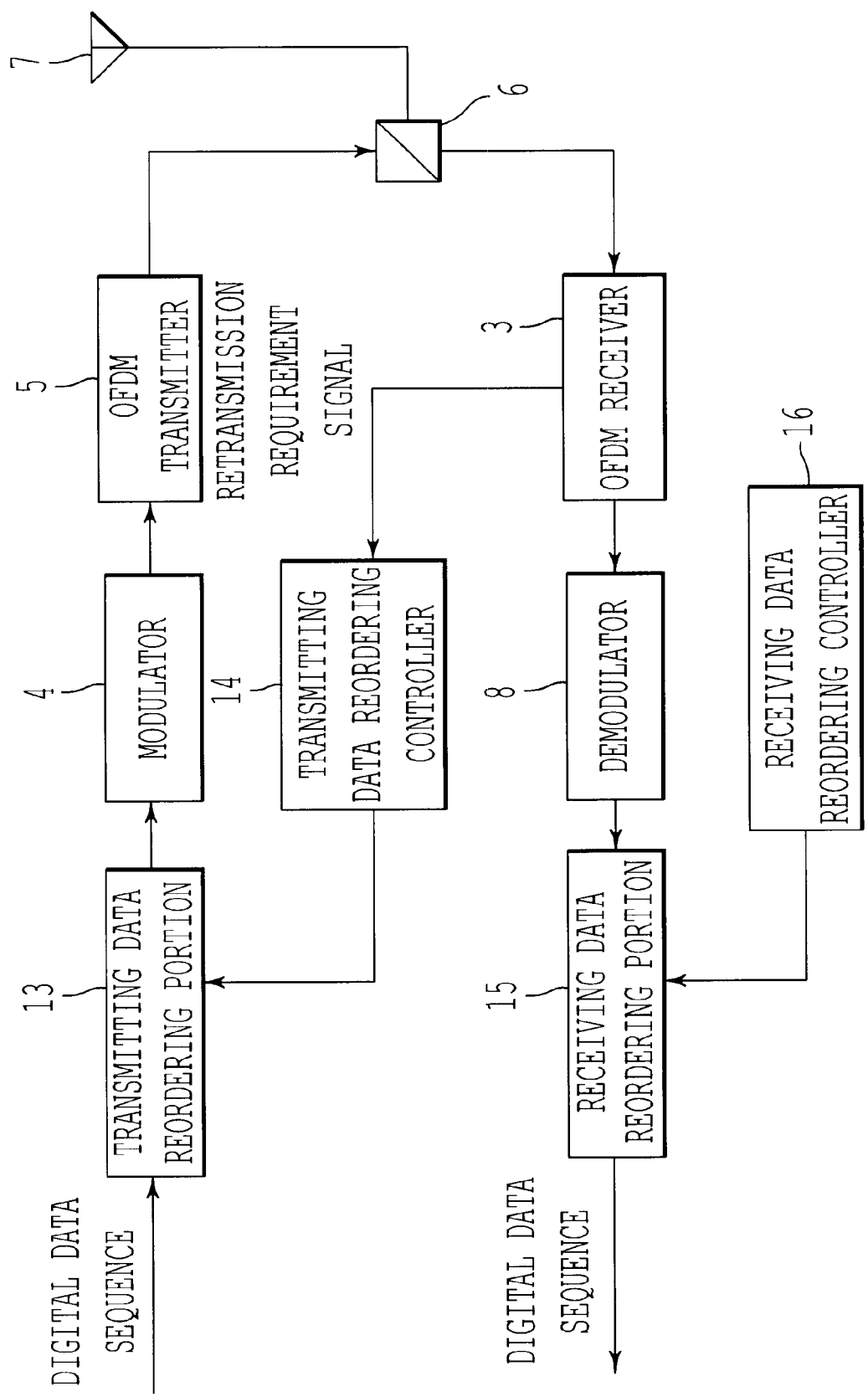
FIG. 6 is a block diagram illustrating a retransmission control apparatus according to a yet further embodiment of the present invention.

FIG. 6 is a block diagram illustrating a further embodiment of the present invention. The same elements as those shown in FIG. 1 are represented by like reference numerals, and an explanation thereof is thus omitted. FIG. 6 illustrates a base station or a radio terminal for use in a radio communication system incorporating the present invention. In this embodiment, upon receiving a retransmission requirement signal, the base station or the radio terminal reorders a digital data sequence to be retransmitted.

The base station and the radio terminal illustrated in FIG. 6 differ from the counterparts shown in FIG. 1 in that a transmitting data reordering portion 13, a transmitting data reordering controller 14, a receiving data reordering portion 15, and a receiving data reordering controller 16 are substituted for the scrambler 1, the scramble controller 2, the descrambler 9, and the descramble controller 10, respectively.

The embodiment illustrated in FIG. 6 is also applicable to the embodiment shown in FIG. 3, in which case, the scrambler 1, the scramble controller 2, the descrambler 9, and the descramble controller 10 shown in FIG. 3 are merely substituted with the transmitting data reordering portion 13, the transmitting data reordering controller 14, the receiving data reordering portion 15, and the receiving data reordering controller 16, respectively.

In this embodiment, a digital data sequence is first input into the transmitting data reordering portion 13. The transmitting data reordering portion 13 then reorders the transmitting data in response to a control signal output from the transmitting data reordering controller 14.

Once the OFDM receiver 3 detects a retransmission request and transmits a retransmission requirement signal, the transmitting data reordering controller 14 sets the reordering method in accordance with the transmission requirement signal. More specifically, the transmitting data reordering controller 14 may control the transmitting data reordering portion 13 to reorder a digital data sequence to be retransmitted in response to a retransmission requirement signal and to not reorder the other digital data sequences.

The retransmission request may be detected by another element other than the OFDM receiver 3. In other words, the retransmission request may be detected, for example, after the data has been transformed into the receiving digital data sequence.

A digital data sequence to be input into the transmitting data reordering portion 13 may be convolutionally coded, reed-Solomon (RS) coded, or interleaved digital data. If the input digital data sequence is not a retransmitting digital data sequence, it may safely bypass the transmitting data reordering portion 13.

The digital data sequence that had been reordered by or that has merely bypassed the transmitting data reordering portion 13 is modulated in the modulator 4 and is then input into the OFDM transmitter 5. The OFDM transmitter 5 creates an OFDM symbol by executing signal processing, such as transforming the digital data into a time signal by performing IFFF, D/A conversion, and guard time insertion for absorbing delayed wave components caused by multipath. The OFDM transmitter 5 further conducts signal conversion on the OFDM symbol, thereby retrieving a transmitting signal. The OFDM symbol is then transmitted from the antenna 7 to the receiving system via the signal branching filter 6.

Meanwhile, the receiving data reordering controller 16 sets in the receiving data reordering portion 15 the reordering method corresponding to the reordering method employed in the transmitting system. The receiving data reordering portion 15 reorders the digital data sequence output from the demodulator 8 so as to restore the originally ordered data. The data is then output from the receiving system.

The operation of the retransmission control apparatus constructed as described above is described below.

The receiving operation of an OFDM symbol by the base station or the radio terminal is first discussed.

It is now assumed that the OFDM symbol received by the antenna 7 is an OFDM data symbol (which is other than an Ack or Nack signal). The OFDM receiver 3 performs signal processing, such as frequency conversion, guard time removal processing, A/D conversion, and transformation into a spectrum signal by executing FFT, on the OFDM symbol received via the signal branching filter 6. The spectrum signal is then input into the demodulator 8. The demodulator 8 transforms the spectrum signal into a receiving digital data sequence and supplies it to the receiving data reordering portion 15. The receiving data reordering portion 15 then reorders the receiving data under the control of the receiving data reordering controller 16 so as to restore the originally ordered digital data sequence that had been before being reordered by the transmitting data reordering portion 13. The digital data sequence is then output from the receiving system.

The control operation performed by the receiving data reordering controller 16 may be, for example, as follows. If the receiving digital data sequence is a retransmitting digital data sequence, the receiving data reordering controller 16 controls the receiving data reordering portion 15 to reorder the retransmitting digital data sequence so as to restore the originally ordered digital data that had been before being reordered by the transmitting data reordering portion 13. If, on the other hand, the receiving digital data sequence is not a retransmitting digital data sequence, the receiving data reordering controller 16 may control the receiving data reordering portion 15 to not reorder the digital data sequence. A determination of whether or not the receiving digital data sequence is a retransmitting digital data sequence may be made when the OFDM receiver 3 receives the OFDM data symbol or after the demodulator 8 transforms the OFDM data symbol into a digital data sequence.

When the OFDM symbol received by the antenna 7 indicates a retransmission requirement signal, according to the OFDM receiver 3 or the digital data sequence output from the receiving data reordering portion 15, that the OFDM signal or the receiving digital data sequence is a retransmission requirement signal. The OFDM receiver-3 then transmits a retransmission requirement signal to the transmitting data reordering controller 14. Upon receipt of the retransmission requirement signal, the retransmission digital data sequence is input into the transmitting data reordering portion 13 and is reordered according to the retransmission requirement signal. The reordered retransmitting digital data sequence is again modulated in the modulator 4 and is transformed into an OFDM data symbol in the OFDM transmitter 5. Thereafter, the OFDM data symbol is transmitted to the receiving system.

Since the retransmitting digital data sequence is reordered in the transmitting system, the time waveform of the retransmitting OFDM data symbol is different from that produced from the same digital data sequence and transmitted to the receiving system before this retransmitting operation. Accordingly, the peak power is accordingly different before and after retransmission.

As stated in the description of the related art, in the radio communication system that transmits OFDM symbols, a limited back-off amount of a transmission power amplifier may distort the time waveform of a transmitting OFDM symbol. This stems from a significant increase in the peak power of the OFDM symbol prior to a retransmitting operation. In contrast, according to the base station and the radio terminal shown in FIG. 6 constructed in accordance with the present invention, the peak power of a retransmitting OFDM symbol is different from that of the OFDM symbol prior to the retransmitting operation. This makes it possible to suppress the amplitude fluctuation of the time waveform of the retransmitting OFDM symbol and thus to improve the average transmission power, thereby reducing the occurrence of transmission errors when digital data is retransmitted.

The operation of the base station-and the radio terminal illustrated in FIG. 6 is described below with reference to the flow chart of FIG. 7. In this embodiment, it is now assumed that an OFDM symbol is transmitted from the base station and received by the radio terminal. The same steps as those shown in FIG. 2 are indicated by like step numbers, and an explanation thereof is thus omitted.

The base station first generates an OFDM data symbol in step S1, and transmits ft to the radio terminal in step S2. The radio terminal receives the OFDM data symbol in step S3, and performs error detection on it in step S4.

If any error is detected in step S4, the radio terminal sends a retransmission requirement signal to the base station in step S5. If an error is not detected in step S4, the radio terminal sends an acknowledgment (Ack) signal to the base station, though it is not essential, and the receiving operation is completed in step S6.

In this embodiment, upon receiving a retransmission requirement signal in step S7, the base station reorders the retransmitting data sequence in step S31 and then creates a retransmitting OFDM data symbol in step S9. Subsequently, the base station transmits the retransmitting OFDM data symbol in step S10, and the radio terminal receives it in step S11.

The radio terminal reorders the retransmitting digital data sequence in step S32 so as to restore the originally ordered digital data sequence that had been before being reordered in the base station. The radio terminal then performs error detection on the digital data sequence in step S13.

If any error is detected in step S13, the process returns to step S5 in which the radio ten-final again sends a retransmission requirement signal to the base station. If an error is not detected in step S13, the process returns to step S6 in which the radio terminal sends an acknowledgment (Ack) signal to the base station, though it is not essential, and the receiving operation is ended.

As discussed above, according to this embodiment, since the retransmitting digital data sequence is reordered, the amplitude fluctuation of the waveform of the retransmitting OFDM data symbol can be inhibited, which further improves the average transmission power. As a result, the occurrence of transmission errors when the digital data is retransmitted can be reduced.

Figure 7:
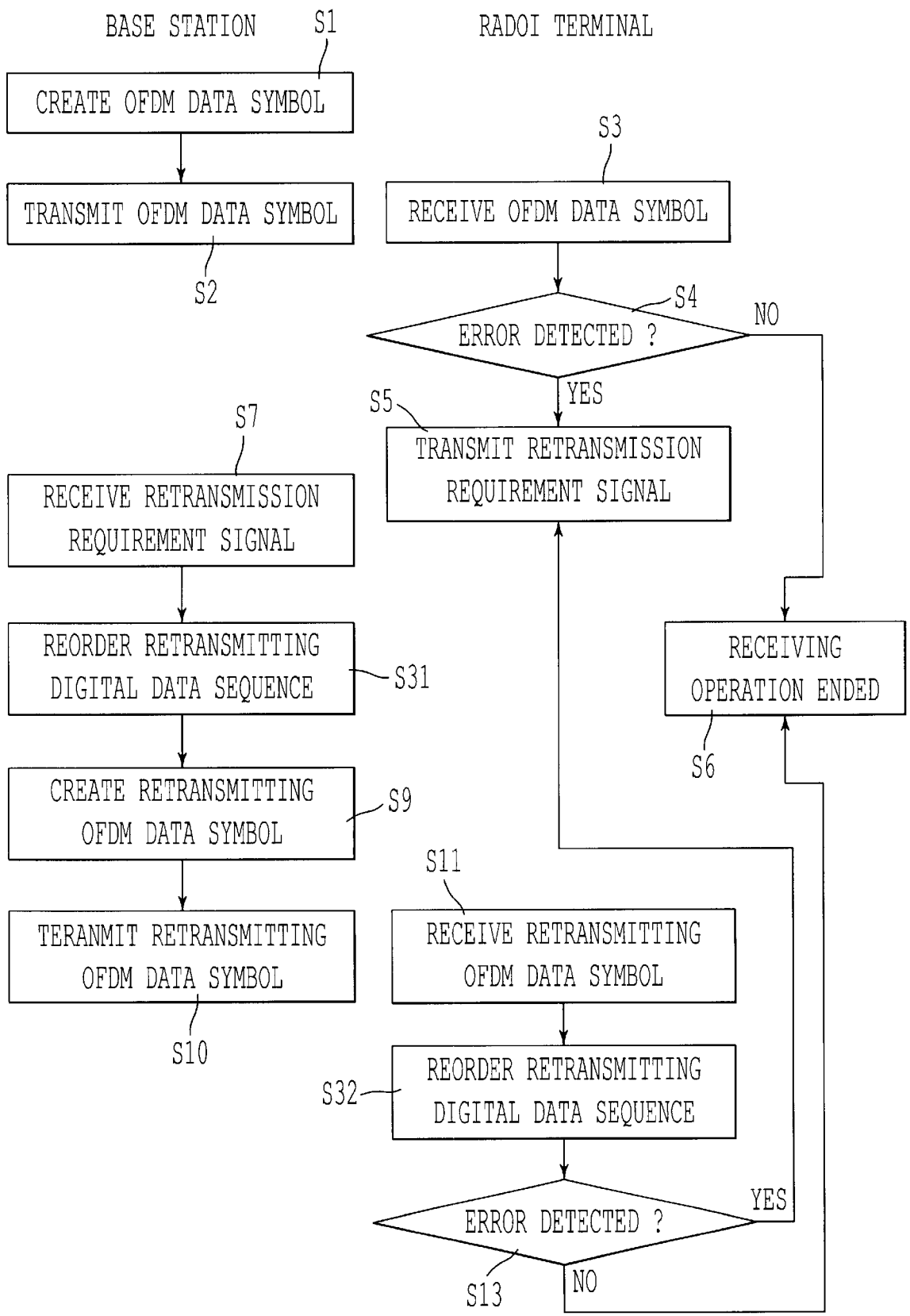
FIG. 7 is a flow chart illustrating a retransmission control method according to a further embodiment of the present invention.
Figure 8:
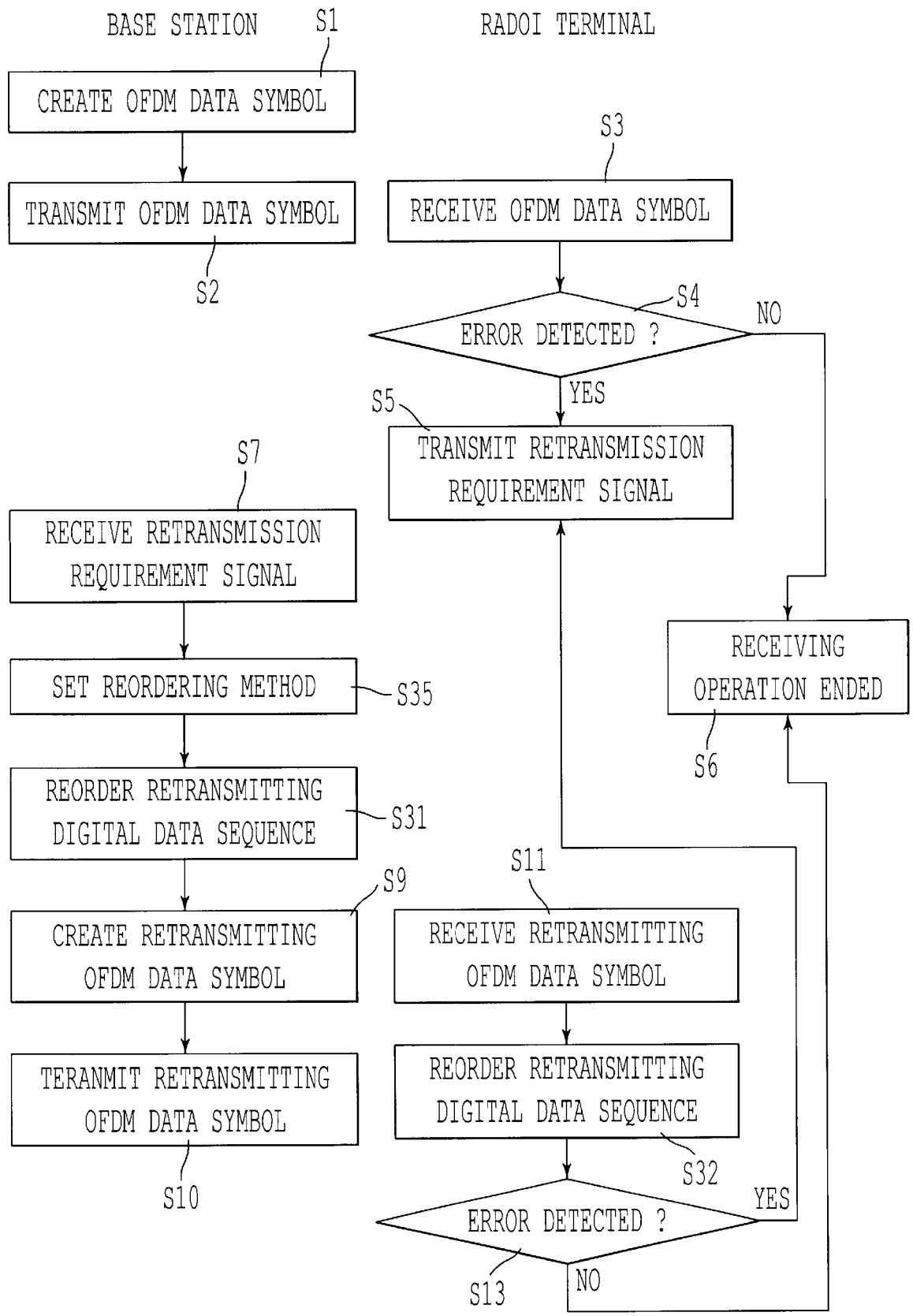
FIG. 8 is a flow chart illustrating a retransmission control method according to a further embodiment of the present invention.

FIG. 8 is a flow chart illustrating a yet further embodiment of the present invention. The same steps as those shown in FIG. 7 are indicated by like step numbers, and an explanation thereof is thus omitted. The base station and the radio terminal constructed in accordance with the embodiment illustrated in FIG. 6 may be used for the counterparts for implementing the retransmission control method of this embodiment.

This embodiment differs from the previous embodiment illustrated in FIG. 7 only in the transmitting data reordering control operation and the receiving data reordering control operation. That is, step S35 is added to the process of the retransmission control method shown in FIG. 7, and only the operations performed by the transmitting data reordering controller 14 and the receiving data reordering controller 16 are different from those of the retransmission control apparatus shown in FIG. 6.

The transmitting operation of an OFDM data symbol by the base station or the radio terminal is first discussed below.

Once the OFDM receiver 3 detects a retransmission request and transmitting a retransmission requirement signal to the transmitting system after the OFDM data symbol has been transmitted, a retransmitting digital data sequence is input into the transmitting data reordering portion 13. The transmitting data reordering controller 14 then sets the reordering method for the retransmitting data sequence in accordance with the number of times that the retransmission requirement signal has been received. The reordering method may be set, for example, as follows. Every time the transmitting data reordering controller 14 receives a retransmission requirement signal, it may select one of the preset reordering methods in turns, or may utilize them randomly.

A description is now given below of the receiving operation of an OFDM data symbol by the base station or the radio terminal according to the retransmission control method illustrated in FIG. 4.

It is now assumed that the OFDM symbol received by the antenna 7 is an OFDM data symbol (which is other than an Ack or Nack signal). The receiving OFDM data symbol is first transformed into a spectrum signal in the OFDM receiver 3 and is then demodulated in the demodulator 8, thereby obtaining a receiving digital data sequence. The receiving data reordering controller 16 sets the reordering method corresponding to the reordering method employed in the transmitting system. Based on the set reordering method, the receiving data reordering portion 15 reorders the digital data sequence so as to retrieve the originally ordered digital data sequence that had been before being reordered in the transmitting system.

If the OFDM symbol received by the antenna 7 is a retransmission requirement signal, it is determined, according to the OFDM receiver 3 or the digital data sequence output from the receiving data reordering portion 15, the number of times that the retransmission requirement signal for the same OFDM signal or the same digital data sequence has been received. Upon receiving the retransmission requirement signal, the transmitting data reordering portion 13 reorders the digital data sequence in accordance with the retransmission requirement signal. The reordered digital data sequence is then modulated in the modulator 4 and is further transformed into an OFDM data symbol in the OFDM transmitter 5. Subsequently, the OFDM data symbol is transmitted to the receiving system.

The operation of the retransmission control apparatus constructed in accordance with this embodiment is discussed hereinafter with reference to FIG. 8. In this embodiment, an OFDM data symbol is transmitted from the base station and is received by the radio terminal.

The base station creates an OFDM data symbol in step 1, and transmits it to the radio terminal in step S2. Upon receipt of the OFDM data symbol in step S3, the radio terminal performs error detection on the OFDM data symbol in step S4.

If any error is detected in step S4, the radio terminal transmits a retransmission requirement signal to the base station in step S5. If an error is not detected in step S4, the radio terminal transmits an acknowledgment (Ack) signal to the base station, though it is not essential, and the receiving operation is completed in step S6.

Meanwhile, upon receiving the retransmission requirement signal in step S7, the base station sets the reordering method for the retransmitting data sequence. In this embodiment, in step S35, the reordering method for the retransmitting data sequence is set in accordance with the number of times that the retransmission requirement signal has been received.

The reordering method may be set, for example, in the transmitting data reordering controller 14 illustrated in FIG. 6 in the following manner. Every time the transmitting data reordering controller 14 receives a retransmission requirement signal, it selects one of the preset reordering methods in turns, or may utilize them randomly.

After the base station reorders the retransmitting data sequence in step S31 according to the reordering method set by the transmitting data reordering controller 14, it generates a retransmitting OFDM data symbol in step S9 and transmits it to the radio terminal in step S10.

Upon receiving the OFDM data symbol in step S11, the radio terminal reorders the retransmitting digital data sequence in step S32, and then performs error detection on the data sequence in step S13. If any error is detected in step S13, the process returns to step S5 in which the radio terminal again transmits a retransmission requirement signal to the base station. If an error is not detected in step S13, the process returns to step S6 in which the radio terminal transmits an acknowledgment (Ack) signal to the base station, though it is not essential, and the receiving operation is completed.

As is seen from the foregoing description, according to this embodiment, the retransmitting digital data sequence is reordered in accordance with the number of times that the retransmission requirement signal has been received. It is thus possible to suppress the amplitude fluctuation of the time waveform of the retransmitting OFDM data symbol and thus to improve the average transmission power. Accordingly, the occurrence of transmission errors in retransmitting the data sequence can be reduced.

Figure 9:
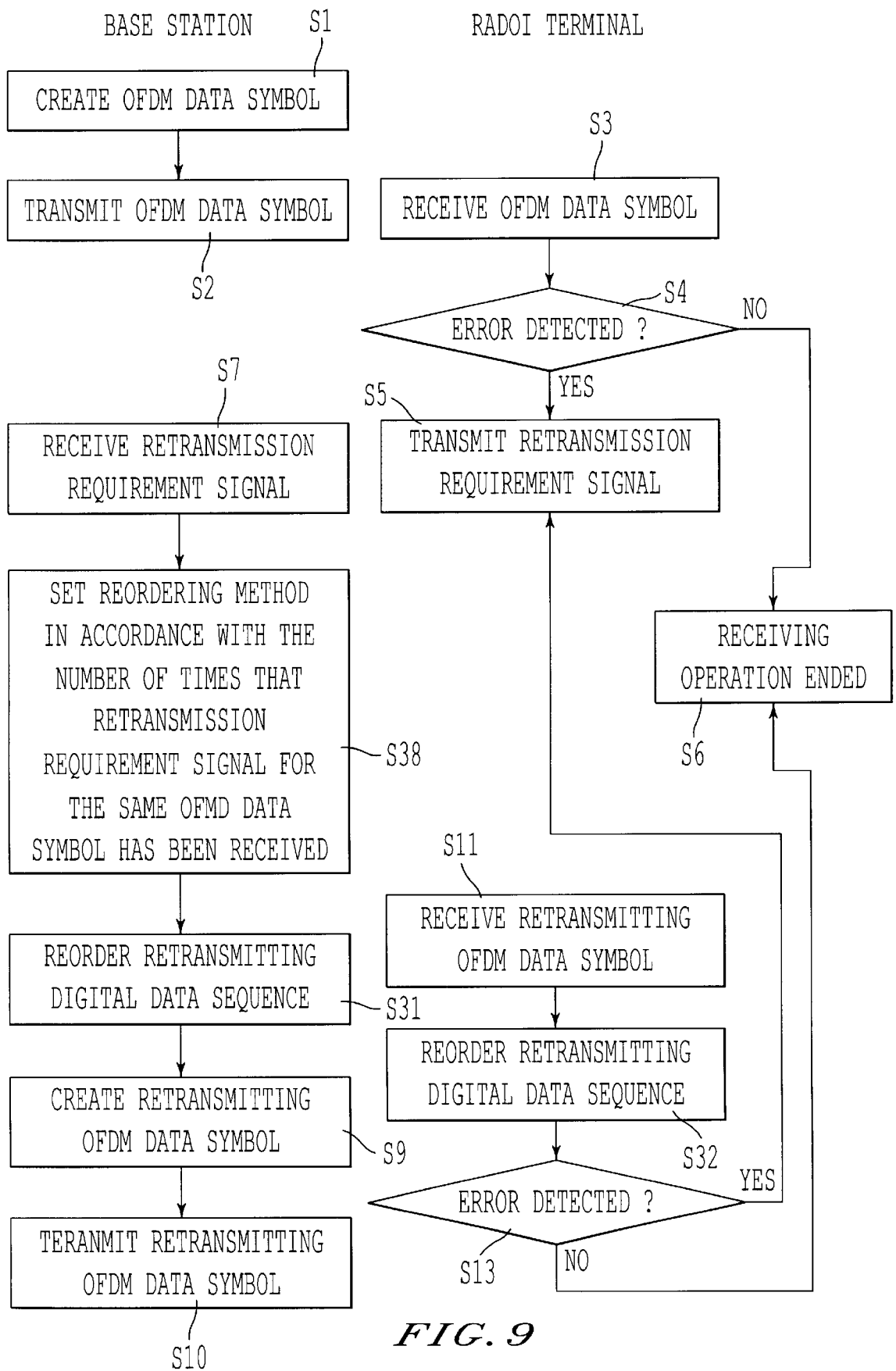
FIG. 9 is a flow chart illustrating a retransmission control method according to a further embodiment of the present invention.

FIG. 9 is a flow chart illustrating a further embodiment of the present invention. The same steps as those shown in FIG. 7 are designated with like step numbers, and an explanation thereof is thus omitted. The base station and the radio terminal constructed in accordance with the embodiment illustrated in FIG. 6 may be used for the counterparts for implementing the retransmission control method of this embodiment.

This embodiment differs from the retransmission control method shown in FIG. 7 merely in the transmitting data reordering operation and the receiving data reordering operation. That is, in this embodiment, step S38 is added to the process of the retransmission control method illustrated in FIG. 7, and only the operations performed by the transmitting data reordering controller 14 and the receiving data reordering controller 16 of this embodiment are different from those of the retransmission control apparatus shown in FIG. 6.

The transmitting operation of an OFDM data symbol by the base station or the radio terminal is first discussed below.

When the OFDM receiver 3 detects a retransmission request and transmits a retransmission requirement signal to the transmitting system, a retransmission digital data sequence is input into the transmitting data reordering portion 13. In this embodiment, the transmitting data reordering controller 14 is able to determine whether the OFDM data symbol input into the retransmitting data reordering portion 13 is identical to that has been input before this retransmitting operation. The transmitting data reordering controller 14 then sets the reordering method for the retransmitting data sequence in accordance with the number of times that the retransmission requirement signal for the same OFDM data symbol has been received. The reordering method may be set, for example, as follows. The transmitting data reordering controller 14 presets a plurality of reordering methods and selects one of them in accordance with the number of times that the retransmission requirement signal for the same OFDM data symbol has been received.

The receiving operation of an OFDM data symbol by the base station or the radio terminal according to the retransmitting control method is now described below.

It is now assumed that the OFDM symbol received by the antenna 7 is an OFDM data symbol (which is other than an Ack or Nack signal). The receiving OFDM data symbol is first transformed into a spectrum signal in the OFDM receiver 3 and is then demodulated in the demodulator 8, thereby obtaining a receiving digital data sequence. The receiving digital data sequence is reordered according to the reordering method specified in the receiving data reordering controller 16 so as to restore the originally ordered data sequence that had been before being reordered in the transmitting system.

More specifically, the receiving data reordering controller 16 sets the reordering method in correspondence with the reordering method set in the transmitting system. The receiving data reordering portion 15 reorders the output of the demodulator 8 so as to reproduce the originally ordered digital data sequence. As noted above, the transmitting data reordering controller 14 sets the reordering method in accordance with the number of times that the retransmission requirement signal for the same OFDM data symbol has been received. This enables the receiving system to set the reordering method according to the number of retransmission requests for the same OFDM data symbol transmitted from the receiving system.

If the OFDM symbol received by the antenna 7 is a retransmission requirement signal, it is possible to determine, according to the OFDM receiver 3 or the digital data sequence output from the receiving data reordering portion 15, the number of times that the retransmission requirement signal for the same digital data sequence has been received. Upon receipt of a retransmission requirement signal, the digital data sequence is reordered in accordance with the retransmission requirement signal. The reordered digital data sequence is again modulated in the modulator 4 and is then transformed into an OFDM data symbol in the OFDM transmitter 5. Thereafter, the OFDM data symbol is transmitted to the receiving system.

A description is given hereinbelow with reference to FIG. 9 of the operation of the retransmission control apparatus constructed in accordance with the above embodiment. In this embodiment, ft is now assumed that an OFDM data symbol is transmitted from the base station and is received by the radio terminal.

The base station generates an OFDM data symbol in step S1, and transmits it to the radio terminal in step S2. Upon receipt of the OFDM data symbol in step S3, the radio terminal performs error detection on the OFDM data symbol in step S4.

If any error is detected in step S4, the radio terminal transmits a retransmission requirement signal to the base station in step S5. If an error is not detected in step S4, the radio terminal transmits an acknowledgment (Ack) signal to the base station, though ft is not essential, and the receiving operation is completed in step S6.

Meanwhile, upon receiving a retransmission requirement signal in step S7, the base station sets the reordering method for the retransmitting data sequence. In this embodiment, in step S38, the reordering method is set in accordance with the number of times that the retransmission requirement signal for the same OFDM data symbol has been received.

The reordering method may be set, for example, in the transmitting data reordering controller 14 shown in FIG. 6 in the following manner. The transmitting data reordering controller 14 presets a plurality of reordering methods and selects one of them in accordance with the number of times that the retransmission requirement signal for the same OFDM data symbol has been received.

In step S31, the base station reorders the retransmitting data sequence according to the reordering method set in step S38, and creates a retransmitting OFDM data symbol in step S9. The base station then transmits the OFDM data symbol in step S10. Upon receiving the OFDM data symbol in step S11, the radio terminal reorders the retransmitting digital data sequence in step S32 so as to reproduce the original data. The radio terminal further performs error detection on the original data in step S13.

If any error is detected in step S13, the process returns to step S5 in which the radio terminal again transmits a retransmission requirement signal to the base station. If an error is not detected in step S13, the process returns to step S6 in which the radio terminal transmits an acknowledgment (Ack) signal to the base station, though it is not essential, and the receiving operation is ended.

As described above, according to this embodiment, the reordering method is selected in accordance with the number of times that the retransmission requirement signal for the same OFDM data symbol has been received. With this arrangement, the amplitude fluctuation of the time waveform of the retransmitting OFDM data symbol can be suppressed. This further enhances the average transmission power, thereby reducing the occurrence of transmission errors when the digital data sequence is retransmitted. Additionally, the average transmission power of the time waveform of the retransmitting, OFDM data symbol varies every time the retransmission requirement signal for the same OFDM data symbol is transmitted. Therefore, an improvement in the average transmission power can reduce the occurrence of the transmission errors in retransmitting the digital data sequence.

Figure 10:
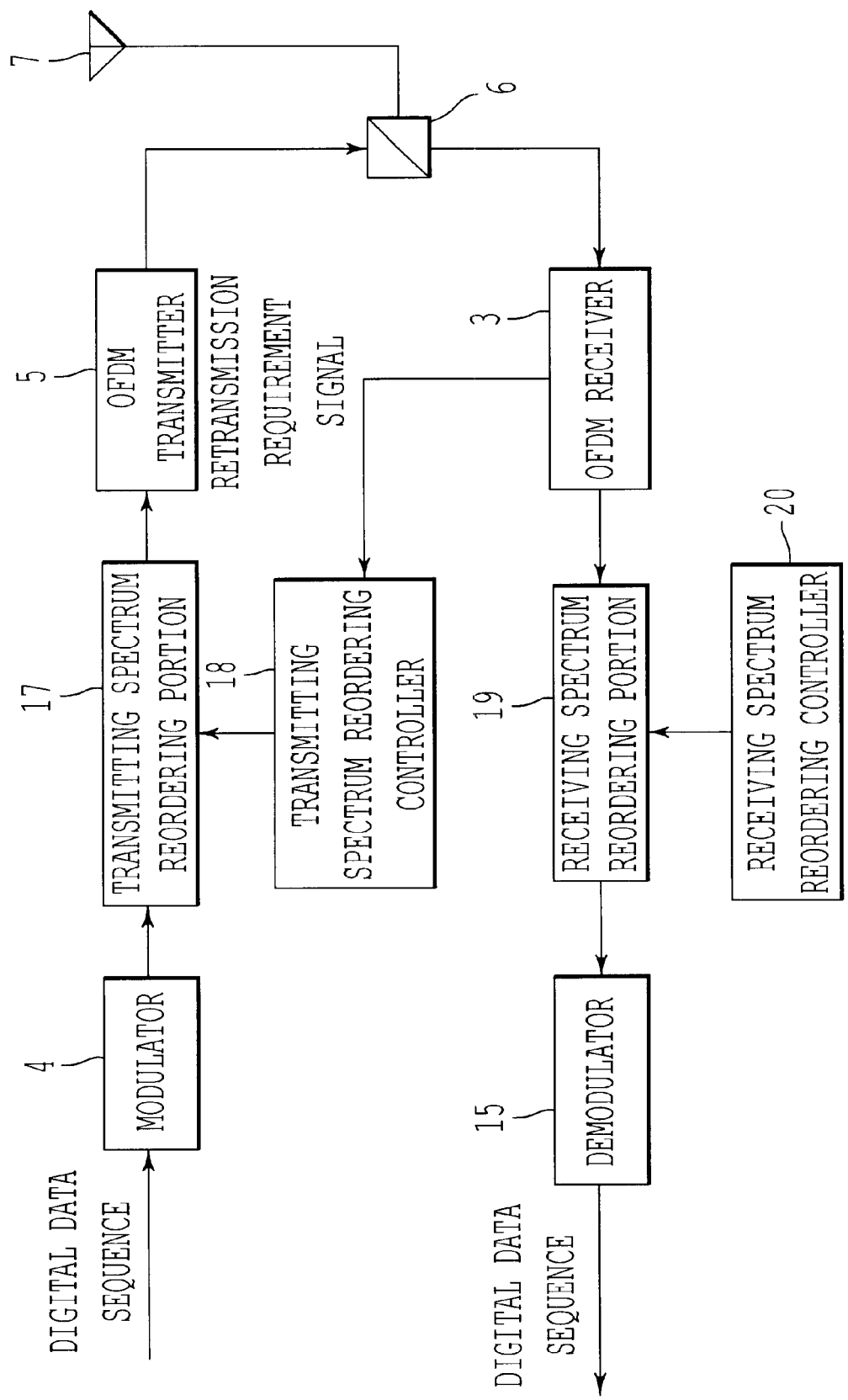
FIG. 10 is a block diagram illustrating a retransmission control apparatus according to a further embodiment of the present invention.

FIG. 10 is a block diagram illustrating a further embodiment of the present invention. The same elements as those shown in FIG. 6 are indicated by like reference numerals, and an explanation thereof is thus omitted. FIG. 10 illustrates a base station and a radio terminal for use in a radio communication system incorporating the present invention. In this embodiment, when the base station or the radio terminal receives a retransmission requirement signal, a modulation signal obtained by modulating a retransmitting digital data sequence is reordered.

The base station and the radio terminal illustrated in FIG. 10 are different from those shown in FIG. 6 only in that a transmitting spectrum reordering portion 17, a transmitting spectrum reordering controller 18, a receiving spectrum reordering portion 19, and a receiving spectrum reordering controller 20 are used in place of the transmitting data reordering portion 13, the transmitting data reordering controller 14, the receiving data reordering portion 15, and the receiving data reordering controller 16 shown in FIG. 6, respectively.

Referring to FIG. 10, a digital data sequence is first input into the modulator 4 and is modulated so as to output a modulation signal. This modulation signal corresponds to a transmitting spectrum of an OFDM symbol. The transmitting spectrum is then input into the transmitting spectrum reordering portion 17 and is reordered in response to a control signal output from the transmitting spectrum reordering controller 18.

It is now assumed that the OFDK4 receiver 3 detects a transmission request and transmits a transmission requirement signal to the transmitting spectrum reordering controller 18. The transmitting spectrum reordering controller 18 then sets the reordering method according to the retransmission requirement signal. The control operation performed by the transmitting spectrum reordering controller 18 may be, for example, as follows. The controller 18 controls the transmitting spectrum reordering portion 17 to reorder a transmitting spectrum obtained by modulating a digital data sequence to be retransmitted in response to a retransmission requirement signal and to not reorder transmitting spectra obtained by modulating the other digital data sequences.

The retransmission request may be detected by another element other than the OFDM receiver 3. For example, the retransmission request may be detected after the data has been transformed into the receiving digital data sequence. A digital data sequence to be input into the modulator 4 may be convolutionally coded, reed-Solomon (RS) coded, or interleaved digital data. If the input digital data sequence is not a retransmitting digital data sequence, it may safely bypass the transmitting spectrum reordering portion 17. In this manner, the transmitting spectrum that has been reordered by or that has merely bypassed the transmitting spectrum reordering portion 17 is input into the OFDM transmitter 5.

The OFDM transmitter 5 creates an OFDM symbol by performing signal processing, such as transforming the digital data into a time signal by executing IFFT, D/A conversion, and guard time insertion for absorbing delayed wave components caused by multipath. The OFDM transmitter 5 further creates a transmitting signal by performing frequency conversion on the OFDM symbol. The OFDM signal is then transmitted to the radio terminal from the antenna 7 via the signal branching filter 6.

Upon receiving the OFDM signal, the receiving spectrum reordering controller 20 sets in the receiving spectrum reordering portion 19 the reordering method corresponding to the reordering method employed by the transmitting system. The receiving spectrum reordering portion 19 then reorders the receiving spectrum output from the OFDM receiver 3 according to the reordering method set by the reordering controller 20 so as to restore the originally ordered spectrum and supplies it to the demodulator 8.

A description is given hereinbelow of the operation performed by the retransmission control apparatus constructed in accordance with the above embodiment.

The receiving operation of an OFDM data symbol performed by the base station or the radio terminal is first discussed.

It is now assumed that the OFDM symbol received by the antenna 7 is an OFDM data symbol (which is other than an Ack or Nack signal). The OFDM receiver 3 performs processing, such as frequency conversion, guard time removal, A/D conversion, and transformation into a spectrum signal by executing FFT, on the OFDM symbol received via the signal branching filter 6. The spectrum signal is then supplied to the receiving spectrum reordering portion 19. The receiving spectrum reordering portion 19 reorders the receiving spectrum under the control of the receiving spectrum reordering controller 20 so as to restore the originally ordered spectrum signal that had been before being reordered by the transmitting spectrum reordering portion 17.

The control operation performed by the receiving spectrum reordering controller 20 may be, for example, as follows. If the receiving digital data sequence is a retransmitting digital data sequence, the receiving spectrum reordering controller 20 controls the receiving spectrum reordering portion 19 to reorder the retransmitting data sequence so as to restore the originally ordered data sequence. Conversely, if the receiving digital data sequence is not a retransmitting digital data sequence, the receiving spectrum reordering controller 20 controls the receiving spectrum reordering portion 19 to not reorder the data sequence. A determination of whether or not the receiving digital data sequence is a retransmitting digital data sequence may be made when the OFDM receiver 3 receives the OFDM data symbol or after the demodulator 8 transforms the OFDM data symbol into a digital data sequence.

Thereafter, the output of the receiving spectrum reordering portion 19 is supplied to the demodulator 8 and is transformed into a receiving digital data sequence.

If the OFDM symbol is a retransmission requirement signal, it is determined, according to the OFDM receiver 3 or the digital data sequence output from the demodulator 8, that the receiving OFDM signal or the receiving digital data sequence is the retransmission requirement signal. Upon receiving the retransmission requirement signal, a retransmitting digital data sequence is input into the modulator 4 and is modulated to obtain a transmitting spectrum. The transmitting spectrum is then supplied to the transmitting spectrum reordering portion 17 and is reordered. The reordered spectrum signal is then transformed into an OFDM data symbol in the OFDM transmitter 5 and is transmitted to the receiving system.

In this manner, since the transmitting spectrum obtained by modulating the retransmitting digital data sequence is reordered, the time waveform of the retransmitting OFDM data symbol is different from that of the OFDM data symbol produced from the same digital data sequence before this retransmitting operation. Accordingly, the peak power is different before and after the retransmitting operation.

As discussed in the description of the related art, in the radio communication system that transmits OFDM symbols, a limited back-off amount of a transmission power amplifier may distort the time waveform of a transmitting OFDM symbol. This originates from a significant increase in the peak power of the OFDM symbol prior to a retransmitting operation. On the other hand, according to the base station and the radio terminal shown in FIG. 10 constructed in accordance with the present invention, the peak power of a retransmitting OFDM symbol is different from that of the OFDM symbol prior to the retransmitting operation. This makes it possible-to suppress the amplitude fluctuation of the time waveform of the retransmitting OFDM symbol and thus to improve the average transmission power, thereby reducing the occurrence of transmission errors when digital data is retransmitted.

The operation of the base station and the radio terminal illustrated in FIG. 10 is described hereinafter with reference to the flow chart of FIG. 11. In this embodiment, an OFDM data symbol is transmitted from the base station and is received by the radio terminal. The same steps as those shown in FIG. 7 are designated with like step numbers, and an explanation thereof is thus omitted.

The base station generates an OFDM data symbol in step S1, and then transmits it to the radio terminal in step S2. Upon receiving the OFDM data symbol in step S3, the radio terminal performs error detection on the OFDM data symbol in step S4.

If any error is detected in step S4, the radio terminal transmits a retransmission requirement signal to the base station in step S5. If an error is not detected in step S4, the radio terminal transmits an acknowledgment (Ack) signal to the base station, though ft is not essential, and the receiving operation is completed in step S6.

In this embodiment, upon receiving a retransmission requirement signal in step S7, the base station reorders a transmitting spectrum signal obtained by modulating the retransmitting digital data sequence in step S41, and then creates a retransmitting OFDM data symbol in step S9. Subsequently, the base station transmits the OFDM data symbol in step S10.

Upon receipt of the OFDM data symbol in step S11, the radio terminal reorders the receiving spectrum in step S42 so as to restore the originally ordered spectrum that had been before being reordered in the base station.

Subsequently, the radio terminal performs error detection on the receiving spectrum in step S13.

If any error is detected in step S13, the process returns to step S5 in which the radio terminal again sends a retransmission requirement signal to the base station. If an error is not detected in step S13, the process returns to step S6 in which the radio terminal sends an acknowledgment (Ack) signal to the base station, though it is not essential, and the receiving operation is ended.

As is seen from the foregoing description, according to the above embodiment, the transmitting spectrum signal obtained by modulating the retransmitting digital data sequence is reordered. With this arrangement, the amplitude fluctuation of the time waveform of the retransmitting OFDM data symbol is inhibited, which further enhances the average transmission power. It is thus possible to reduce the occurrence of transmission errors when the digital data sequence is retransmitted.

Figure 11:
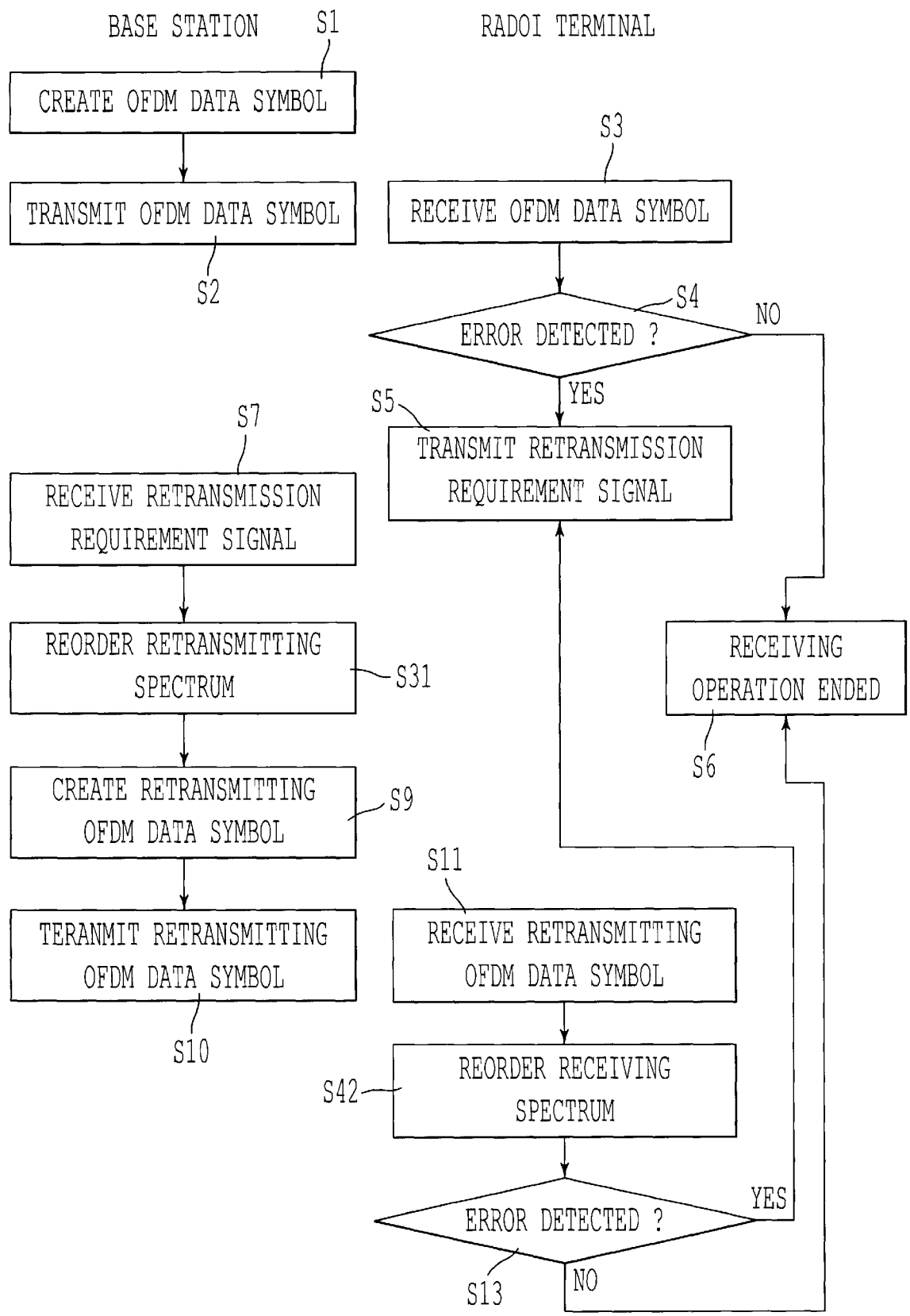
FIG. 11 is a flow chart illustrating a retransmission control method according to a further embodiment of the present invention.
Figure 12:
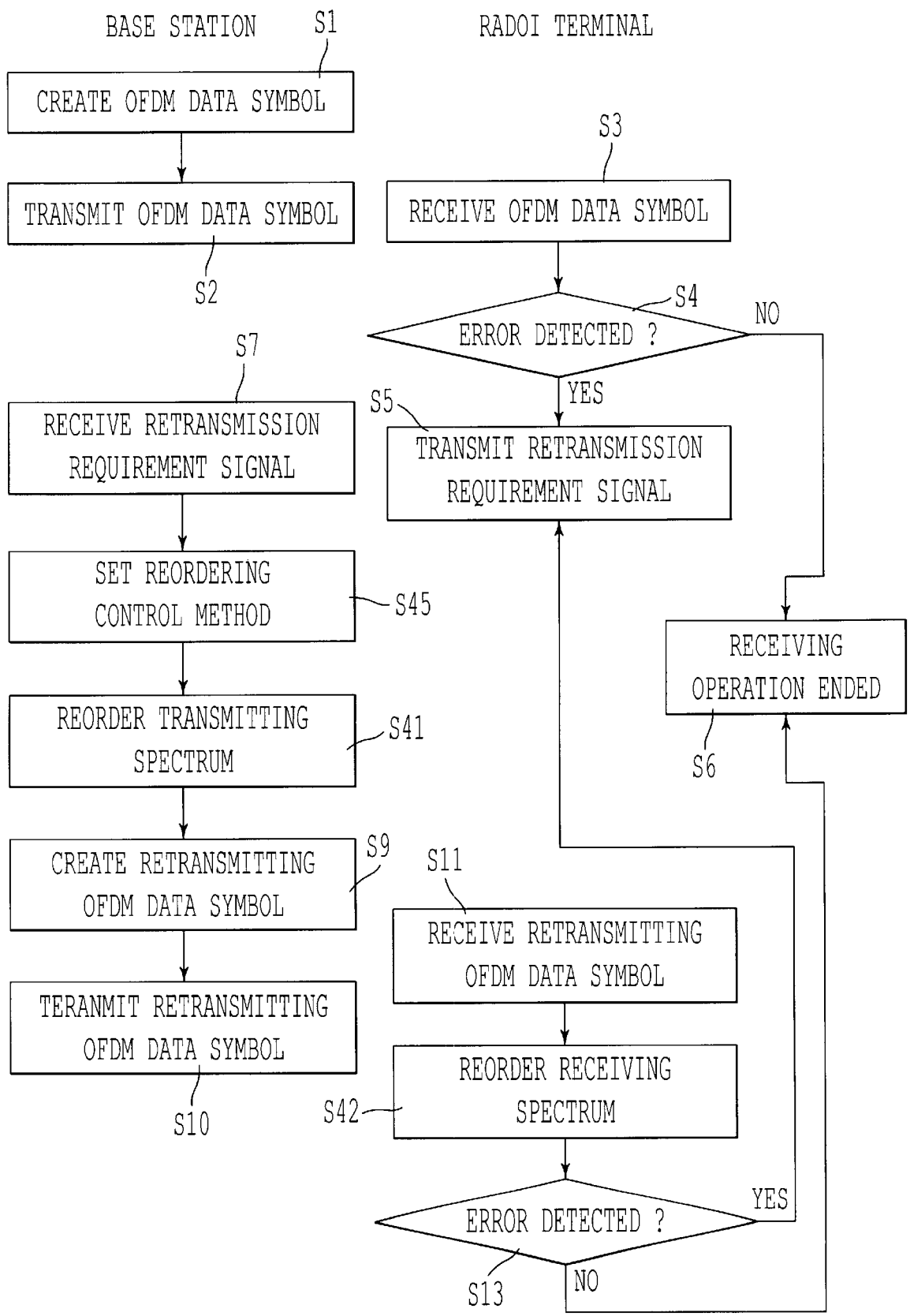
FIG. 12 is a flow chart illustrating a retransmission control method according to a further embodiment of the present invention.

FIG. 12 is a flow chart illustrating a further embodiment of the present invention. The same steps as those shown in FIG. 11 are indicated by like step numbers, and an explanation thereof is thus omitted. The base station and the radio terminal constructed in accordance with the embodiment illustrated in FIG. 10 may be used for the counterparts for implementing the retransmission control method of this embodiment.

This embodiment differs from the previous embodiment illustrated in FIG. 11 merely in the reordering control operation for transmitting data and the reordering control operation for receiving data. That is, step S45 is added to the process of the retransmission control method shown in FIG. 11, and only the operations performed by the transmitting spectrum reordering controller 18 and the receiving spectrum reordering controller 20 are different from those used in the retransmitting control method shown in FIG. 11.

The transmitting operation of an OFDM data symbol by the base station or the radio terminal is first discussed below.

When the OFDM receiver 3 detects a retransmission request and transmits a retransmission requirement signal after an OFDM data symbol is transmitted, a retransmitting digital data sequence is again transformed into a transmitting spectrum by the modulator 4. The transmitting spectrum reordering controller 18 then sets the reordering method for the transmitting spectrum in accordance with the number of times that the retransmission requirement signal has been transmitted by the OFDM receiver 3. The reordering method may be set, for example, as follows. Every time the transmitting spectrum reordering controller 18 receives a retransmission requirement signal, it may select one of the preset reordering methods in turns, or may utilize them randomly.

The transmitting spectrum output from the modulator 4 is reordered by the transmitting spectrum reordering portion 17 according to the reordering method set by the transmitting spectrum reordering controller 18 and is then input into the OFDM transmitter 5. The transmitting spectrum is further transformed into an OFDM symbol and is transmitted from the antenna 7 via the signal branching filter 6.

The receiving operation of an OFDM data symbol by the base station or the radio terminal according to the retransmission control method is now described below.

It is now assumed that the OFDM data symbol received by the antenna 7 is an OFDM data symbol (which is other than an Ack or Nack signal). The receiving OFDM data symbol is first transformed into a spectrum signal in the OFDM receiver 3 and is then supplied to the receiving spectrum reordering portion 19. The receiving spectrum reordering controller 20 sets the reordering method in correspondence with the transmitting spectrum reordering method set in the transmitting system. The receiving spectrum reordering portion 19 then reorders the receiving spectrum based on the reordering method set by the receiving spectrum reordering controller 20. Accordingly, the originally ordered receiving spectrum that had been before being reordered in the transmitting system is retrieved. The receiving spectrum is then supplied to the demodulator 8 and is demodulated, thereby obtaining the original receiving digital data sequence.

If the OFDM symbol received by the antenna 7 is a retransmission requirement signal, ft is determined, according to the OFDM receiver 3 or the digital data sequence output from the demodulator 8, the number of times that the retransmission requirement signal for the same OFDM signal or the same digital data sequence has been received. Upon receiving the retransmission requirement signal, the transmitting spectrum obtained by modulating the digital data sequence is reordered in accordance with the retransmission requirement signal and is then transformed into an OFDM data symbol in the OFDM transmitter 5. Thereafter, the OFDM data symbol is transmitted to the receiving system.

A description is given hereinbelow with reference to FIG. 12 of the operation of the transmission control apparatus constructed in accordance with the above embodiment. In this embodiment, an OFDM data symbol is transmitted from the base station and is received by the radio terminal.

The base station first generates an OFDM data symbol in step S1, and then transmits it to the radio terminal in step S2. Upon receipt of the OFDM data symbol in step S3, the radio terminal performs error detection on the OFDM data symbol in step S4.

If any error is detected in step S4, the radio terminal transmits a retransmission requirement signal to the base station in step S5. If an error is not detected in step S4, the radio terminal transmits an acknowledgment (Ack) signal to the base station, though it is not essential, and the receiving operation is ended in step S6.

Meanwhile, upon receiving the retransmission requirement signal in step S7, the base station sets the reordering method for the transmitting spectrum obtained by modulating the retransmitting digital data sequence. In this embodiment, the reordering method is set in step S45 in accordance with the number of times that the retransmitting requirement signal has been received.

The reordering method is set, for example, in the transmitting spectrum reordering controller 18 shown in FIG. 10 in the following manner. Every time the transmitting spectrum reordering controller 18 receives a retransmission requirement signal, it may select one of the preset reordering methods in turns, or may utilize them randomly.

The base station reorders the transmitting spectrum in step S41 according to the reordering method set by the transmitting spectrum controller 18. The base station then creates a retransmitting OFDM data symbol in step S9, and transmits it in step S10.

Upon receiving the OFDM data symbol in step S11, the radio terminal reorders the receiving spectrum in step S42 and further performs error detection on the receiving spectrum in step S13.

If any error is detected in step S13, the process returns to step S5 in which the radio terminal again sends a retransmission requirement signal to the base station. If an error is not detected in step S13, the process returns to step S6 in which the radio terminal sends an acknowledgment (Ack) signal to the base station, though it is not essential, and the receiving operation is ended.

As discussed above, according to this embodiment, the spectrum obtained by modulating the retransmitting digital data sequence is reordered in accordance with the number of times that the retransmission requirement signal has been received. Therefore, the amplitude fluctuation of the time waveform of the retransmitting OFDM data symbol ran be inhibited, which further improves the average transmission power, thereby lowering the occurrence of transmission errors in retransmitting the digital data Sequence.

Figure 13:
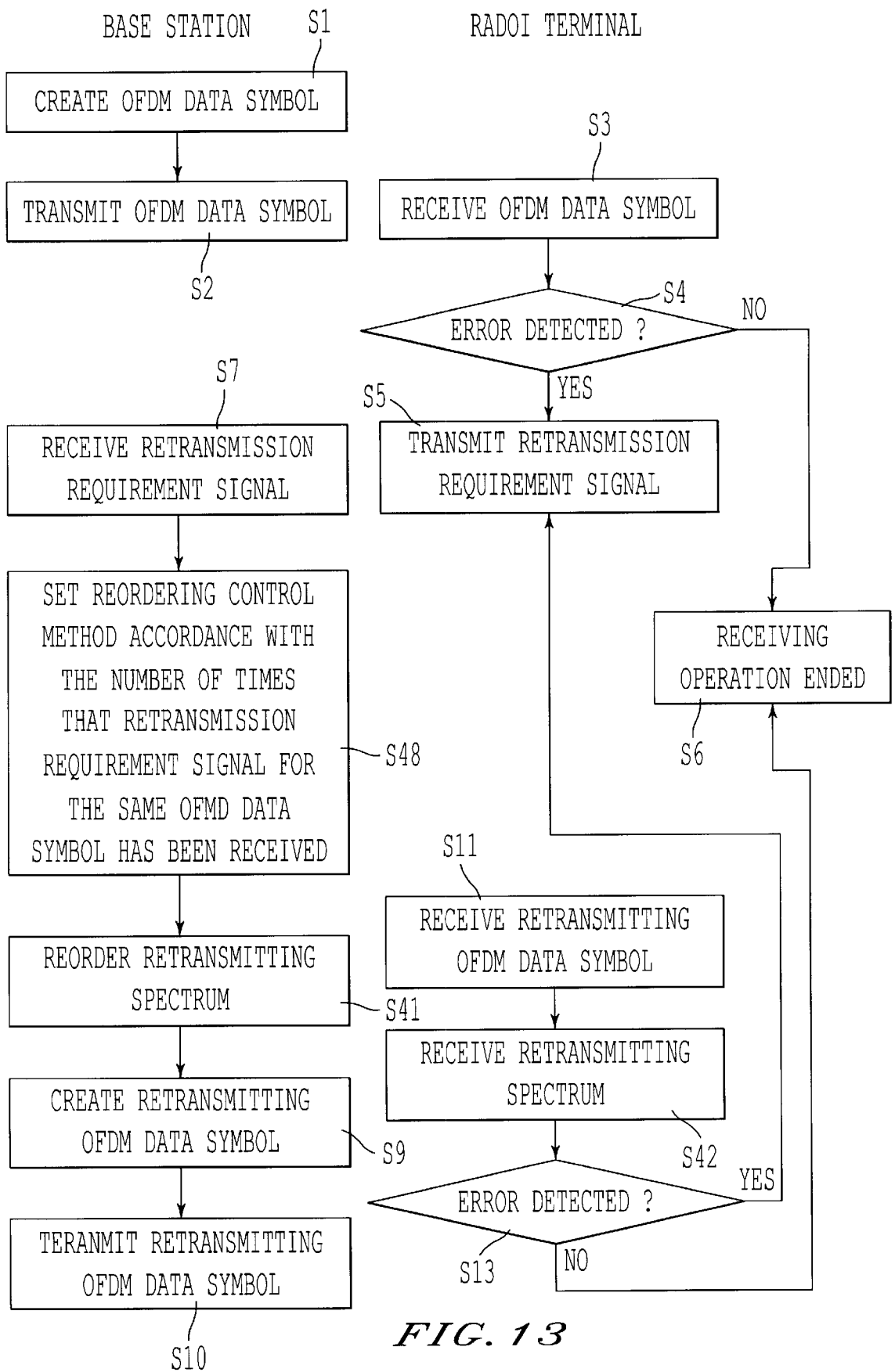
FIG. 13 is a flow chart illustrating a retransmission control method according to a further embodiment of the present invention.

FIG. 13 is a flow chart illustrating a further embodiment of the present invention. The same steps as those shown in FIG. 11 are indicated by like step numbers, and an explanation thereof is thus omitted. The base station and the radio terminal constructed in accordance with the embodiment illustrated in FIG. 10 may be used for the counterparts for implementing the retransmission control method of this embodiment.

This embodiment differs from the retransmission control method illustrated in FIG. 11 merely in the transmitting data reordering method and the receiving data reordering method. Namely, step S48 is added to the process of the retransmission control method shown in FIG. 11, and only the operations performed by the transmitting spectrum reordering controller 18 and the receiving spectrum reordering controller 20 shown in FIG. 10 are different from those used in the retransmitting control method shown in FIG. 11.

The transmitting operation of an OFDM data symbol performed by the base station or the radio terminal is first discussed below.

Once the OFDM receiver 3 detects a retransmission request and transmits a retransmission requirement signal, a retransmitting digital data sequence is input into the modulator 4 and is then transformed into a transmitting spectrum. The transmitting spectrum is further supplied to the transmitting spectrum reordering portion 17. In this embodiment, the transmitting spectrum reordering controller 18 is able to determine whether the OFDM data symbol input into the transmitting spectrum reordering portion 17 is the same as that had been before this retransmitting operation. The transmitting spectrum reordering controller 18 then sets the reordering method for the transmitting spectrum obtained by modulating the retransmitting digital data in accordance with the number of times that the retransmission requirement signal for the same OFDM data symbol has been received. The reordering method may be set, for example, as follows. The transmitting spectrum reordering controller 18 presets a plurality of reordering methods and selects one of them in accordance with the number of times that the retransmission requirement signal for the same OFDM data symbol has been received.

The receiving operation of an OFDM data symbol conducted by the base station or the radio terminal according to the retransmission control method shown in FIG. 13 is described below.

It is now assumed that the OFDM data symbol received by the antenna 7 is an OFDM data symbol (which is other than an Ack or Nack signal). The receiving OFDM data symbol is first transformed into a spectrum signal in the OFDM receiver 3 and is then supplied to the receiving spectrum reordering portion 19. The receiving spectrum is transformed into the originally ordered spectrum that had been before being reordered in the transmitting system according to the reordering method specified by the receiving spectrum reordering controller 20. The receiving spectrum is then demodulated in the demodulator 8, thereby obtaining the original receiving digital data sequence.

If the OFDM symbol received by the antenna 7 is a retransmission requirement signal, it is determined, according to the OFDM receiver 3 or the digital data sequence output from the demodulator 8, the number of times that the retransmission requirement signal for the same OFDM symbol or the same digital data sequence has been received. Upon receiving the retransmission requirement signal, the transmitting spectrum obtained by modulating the digital data sequence is reordered in accordance with the retransmission requirement signal and is then transformed into an OFDM data symbol in the OFDM transmitter 5. Thereafter, the OFDM data symbol is transmitted to the receiving system.

A description is given hereinafter with reference to FIG. 13 of the operation of the retransmission control apparatus constructed in accordance with the above embodiment. In this embodiment, an OFDM data symbol is transmitted from the base station and is received by the radio terminal.

The base station first generates an OFDM data symbol in step S1, and then transmits it to the radio terminal in step S2. Upon receipt of the OFDM data symbol in step S3, the radio terminal performs error detection on the OFDM data symbol in step S4.

If any error is detected in step S4, the radio terminal transmits a retransmission requirement signal to the base station in step S5. If an error is not detected in step S4, the radio terminal transmits an acknowledgment (Ack) signal to the base station, though it is not essential, and the receiving operation is ended in step S6.

Meanwhile, upon receiving the retransmission requirement signal in step S7, the base station sets the reordering method for the transmitting spectrum obtained by modulating the retransmitting digital sequence. In this embodiment, the reordering method is set in step S48 in accordance with the number of times that the retransmitting requirement signal for the same OFDM data symbol has been received.

The reordering method may be set, for example, in the transmitting spectrum reordering controller 18 shown in FIG. 10 in the following manner. The transmitting spectrum reordering controller 18 presets a plurality of reordering methods corresponding to the respective number of times that the retransmission requirement signal for the same OFDM data symbol has been received, and then selects one of the preset reordering methods.

The base station reorders the transmitting spectrum in step S41 according to the reordering method set by the transmitting spectrum reordering controller 18 in step S48. The base station then creates a retransmitting OFDM data symbol in step S9 and transmits it in step S10.

Upon receiving the OFDM data symbol in step S11, the radio terminal reorders the receiving spectrum in step S42 so as to reproduce the original data, and further performs error detection on the data in step S13.

If any error is detected in step S13, the process returns to step S5 in which the radio terminal again sends a retransmission requirement signal to the base station. If an error is not detected in step S13, the process returns to step S6 in which the radio terminal sends an acknowledgment (Ack) signal to the base station, though it is not essential, and the receiving operation is ended.

As described above, according to the above embodiment, the transmitting spectrum obtained by modulating the retransmitting digital data sequence is reordered in accordance with the number of times that the retransmission requirement signal for the same OFDM data symbol has been received. Therefore, the amplitude fluctuation of the time waveform of the retransmitting OFDM data symbol can be suppressed, which further enhances the average transmission power. As a result, the occurrence of transmission errors in retransmitting the digital data sequence can be reduced. Additionally, the average transmission power of the time waveform of the OFDM data symbol is changed every time the retransmission requirement signal for the same OFDM data symbol is sent. Thus, an improvement in the average transmission power can reduce the occurrence of the transmission errors when the digital data sequence is retransmitted.

As is seen from the foregoing description, the present invention offers the following advantages. When a digital data sequence is retransmitted, the time waveform of an OFDM data symbol is differentiated from that had been prior to a retransmitting operation. Additionally, every time a digital data sequence is retransmitted, it is scrambled by using a scramble sequence different from that used before a retransmitting operation. Alternatively, a digital data is reordered every time it is retransmitted. Or, a spectrum signal obtained by modulating a digital data sequence is reordered every time it is retransmitted. With the above arrangement, the amplitude fluctuation of the time waveform of the retransmitting OFDM data symbol can be suppressed, which further improves the average transmission power. Accordingly, the occurrence of transmission power when the digital data is retransmitted can be reduced, thereby achieving an improvement in the throughput.

What is claimed is:

1. A retransmission control apparatus for use in a radio communication system that uses an orthogonal frequency division multiplexing technique, said apparatus comprising:

a transmitter which transmits to a radio station a data sequence, which serves as communication data that has been transformed into a time waveform of an orthogonal frequency division multiplexing symbol;

a receiver which receives from said radio station a retransmission request for retransmitting the communication data;

a transformation mechanism configured to transform, in response to the retransmission request, the data sequence of the communication data to be retransmitted into an orthogonal frequency division multiplexing symbol having a time waveform different from the time waveform of the orthogonal division multiplexing symbol which had been sent before the retransmission request, wherein said transformation mechanism comprises, reordering means for reordering, in response to the retransmission request, a spectrum signal obtained by modulating the data sequence of the communication data to be retransmitted at least for the same communication data, in accordance with a reordering method that varies every time the data sequence is retransmitted; and a retransmitting mechanism configured to retransmit the communication data transformed by said transformation mechanism to said radio station.

2. The retransmission control apparatus of claim 1, wherein the reordering method used by said reordering means varies according to the number of times that the retransmission request for the same communication data has been received.

3. A retransmission control method for use by a transmitting radio station in a communication system which is formed of a plurality of radio stations for transmitting and receiving communication data by using an orthogonal frequency division multiplexing technique, comprising the steps of:

receiving a retransmission request for retransmitting the communication data from a receiving radio station;

transforming, in response to the retransmission request, a data sequence to be retransmitted into an orthogonal frequency division multiplexing symbol having a time waveform different from the time waveform of the orthogonal frequency division multiplexing symbol which had been sent before the retransmission request, wherein said transforming step comprises, reordering, in response to the retransmission request, a spectrum signal obtained by modulating the data sequence to be retransmitted at least for the same transmitting data, in accordance with a reordering method that varies every time the data sequence is retransmitted, so as to obtain an orthogonal frequency division multiplexing symbol having a time waveform different from the time waveform of the orthogonal frequency division multiplexing symbol which had been sent before the retransmission request; and transmitting the orthogonal frequency division multiplexing symbol as a retransmission signal in correspondence with the retransmission request.

4. A retransmission control method of claim 3, wherein the reordering method used in said reordering step varies according to the number of times that the retransmission request for the same transmitting data has been received.

* * * * *